United States Patent
Anan et al.

(10) Patent No.: US 10,362,552 B2
(45) Date of Patent: Jul. 23, 2019

(54) TERMINAL DEVICE, NON-TRANSITORY COMPUTER READABLE STORAGE MEDIUM, AND INSURANCE CONDITION DETERMINATION DEVICE

(71) Applicant: YAHOO JAPAN CORPORATION, Tokyo (JP)

(72) Inventors: Miho Anan, Tokyo (JP); Yasuaki Hyodo, Tokyo (JP); Takamitsu Iriyama, Tokyo (JP); Shinsuke Sato, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 15/450,906

(22) Filed: Mar. 6, 2017

(65) Prior Publication Data
US 2017/0273047 A1    Sep. 21, 2017

(30) Foreign Application Priority Data
Mar. 18, 2016   (JP) .................................. 2016-055710

(51) Int. Cl.
*H04W 4/02*    (2018.01)
*G06Q 40/08*   (2012.01)
(Continued)

(52) U.S. Cl.
CPC ............ *H04W 64/00* (2013.01); *G06Q 10/00* (2013.01); *G06Q 10/0635* (2013.01);
(Continued)

(58) Field of Classification Search
CPC ....... H04W 4/12; H04W 4/16; H04W 84/005; H04W 4/021; H04W 4/027; H04W 8/22; H04W 4/028; H04W 4/046; H04W 64/006; G01S 5/0009; H04L 67/18; H04L 51/20; H04M 1/72519; H04M 1/72552
See application file for complete search history.

(56) References Cited

U.S. PATENT DOCUMENTS

2002/0177928 A1*  11/2002  Moriguchi .......... H04M 1/6091
                                                                      701/1
2011/0021211 A1*   1/2011  Ohki .................... G01C 21/362
                                                                      455/456.3
(Continued)

FOREIGN PATENT DOCUMENTS

JP    2003-281375 A    10/2003
JP    2003-308278 A    10/2003
(Continued)

OTHER PUBLICATIONS

Feb. 28, 2017 Office Action issued in Japanese Patent Application No. 2016-055710.

*Primary Examiner* — Olumide Ajibade Akonai
(74) *Attorney, Agent, or Firm* — Oliff PLC

(57) ABSTRACT

A terminal device that includes a first execution unit that executes a first application having a navigation function for a user in a vehicle, and a second execution unit that executes a second application having a transmission function and a reception function of a message, and the second execution unit automatically replies to the message in cooperation with the first application in a case where the second execution unit receives the message to the second application while the vehicle is being driven.

13 Claims, 17 Drawing Sheets

(51) Int. Cl.
  *H04L 29/08* (2006.01)
  *H04W 64/00* (2009.01)
  *G06Q 10/00* (2012.01)
  *G06Q 10/06* (2012.01)

(52) U.S. Cl.
  CPC ... *G06Q 10/0637* (2013.01); *G06Q 10/06398* (2013.01); *G06Q 40/08* (2013.01); *H04L 67/12* (2013.01); *H04L 67/18* (2013.01); *H04L 67/20* (2013.01); *H04L 67/22* (2013.01); *H04L 67/26* (2013.01); *H04W 4/02* (2013.01)

(56) References Cited

U.S. PATENT DOCUMENTS

| | | | | |
|---|---|---|---|---|
| 2013/0217331 | A1* | 8/2013 | Manente | H04W 4/008 455/41.2 |
| 2013/0303106 | A1* | 11/2013 | Martin | H04W 4/12 455/404.2 |
| 2013/0303143 | A1* | 11/2013 | Schrader | H04W 12/08 455/418 |
| 2014/0277826 | A1* | 9/2014 | Fujii | B60R 21/01516 701/1 |
| 2015/0339928 | A1* | 11/2015 | Ramanujam | G08G 1/202 701/23 |
| 2015/0373666 | A1* | 12/2015 | Malahy | H04W 68/00 455/414.1 |
| 2016/0290811 | A1* | 10/2016 | Watterson | B61L 21/06 |

FOREIGN PATENT DOCUMENTS

| | | |
|---|---|---|
| JP | 2006-033377 A | 2/2006 |
| JP | 2012-208053 A | 10/2012 |
| JP | 2014-149882 A | 8/2014 |
| JP | 2014-233998 A | 12/2014 |
| WO | 2014/049719 A1 | 4/2014 |

\* cited by examiner

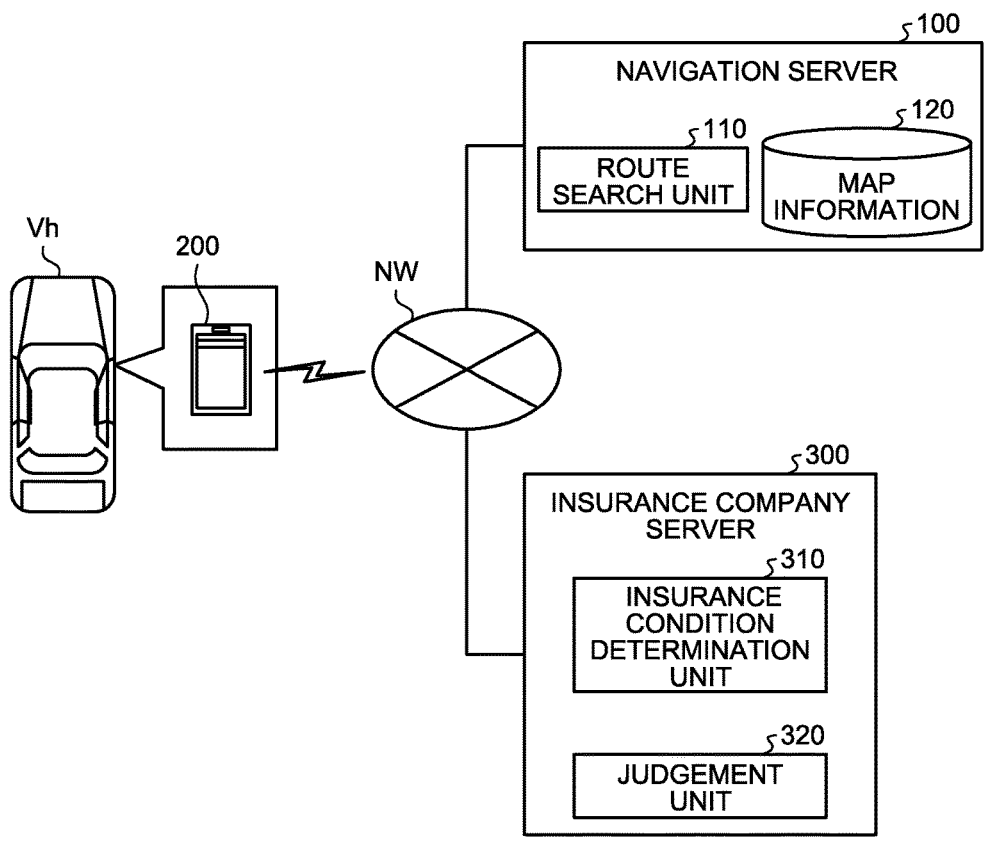

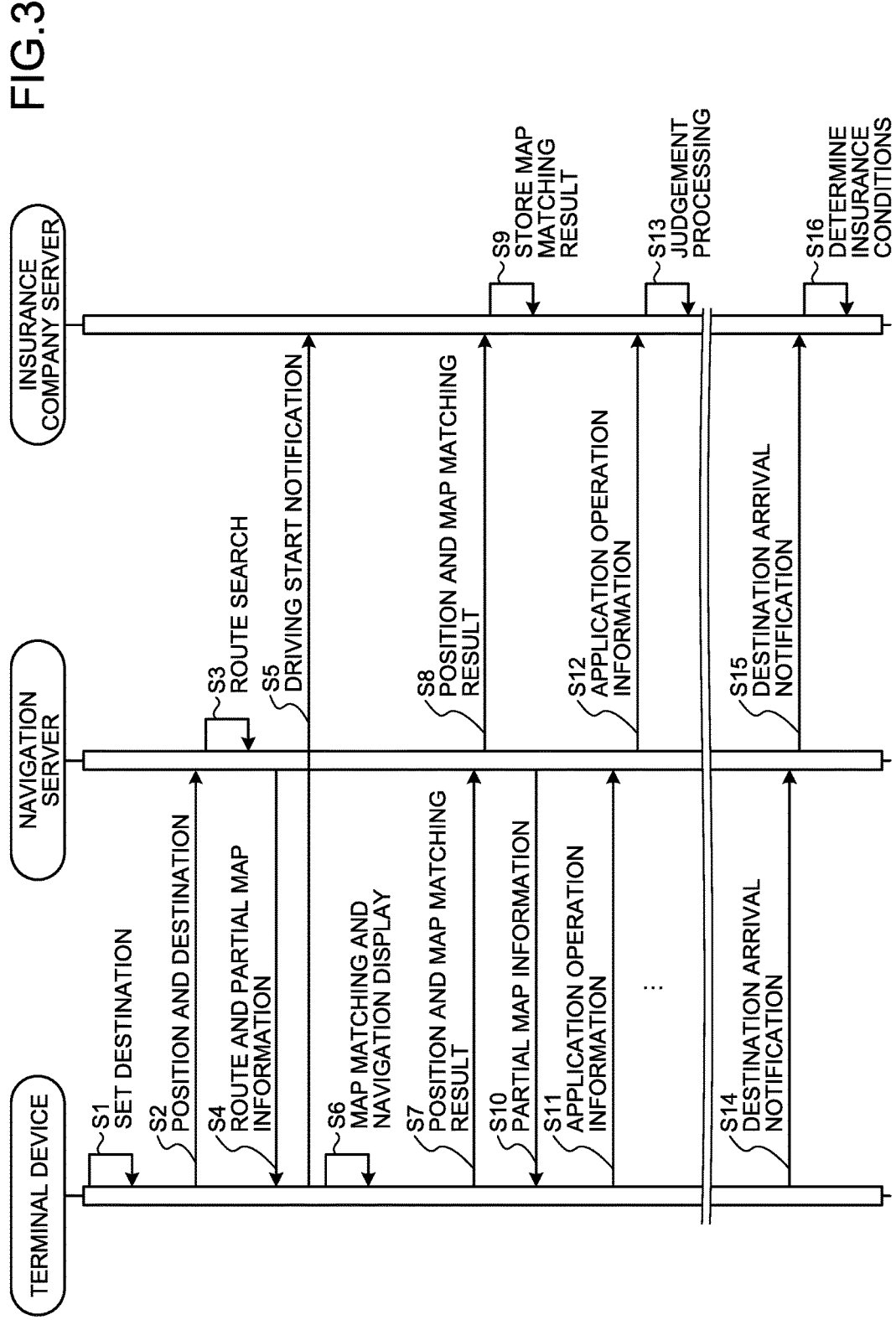

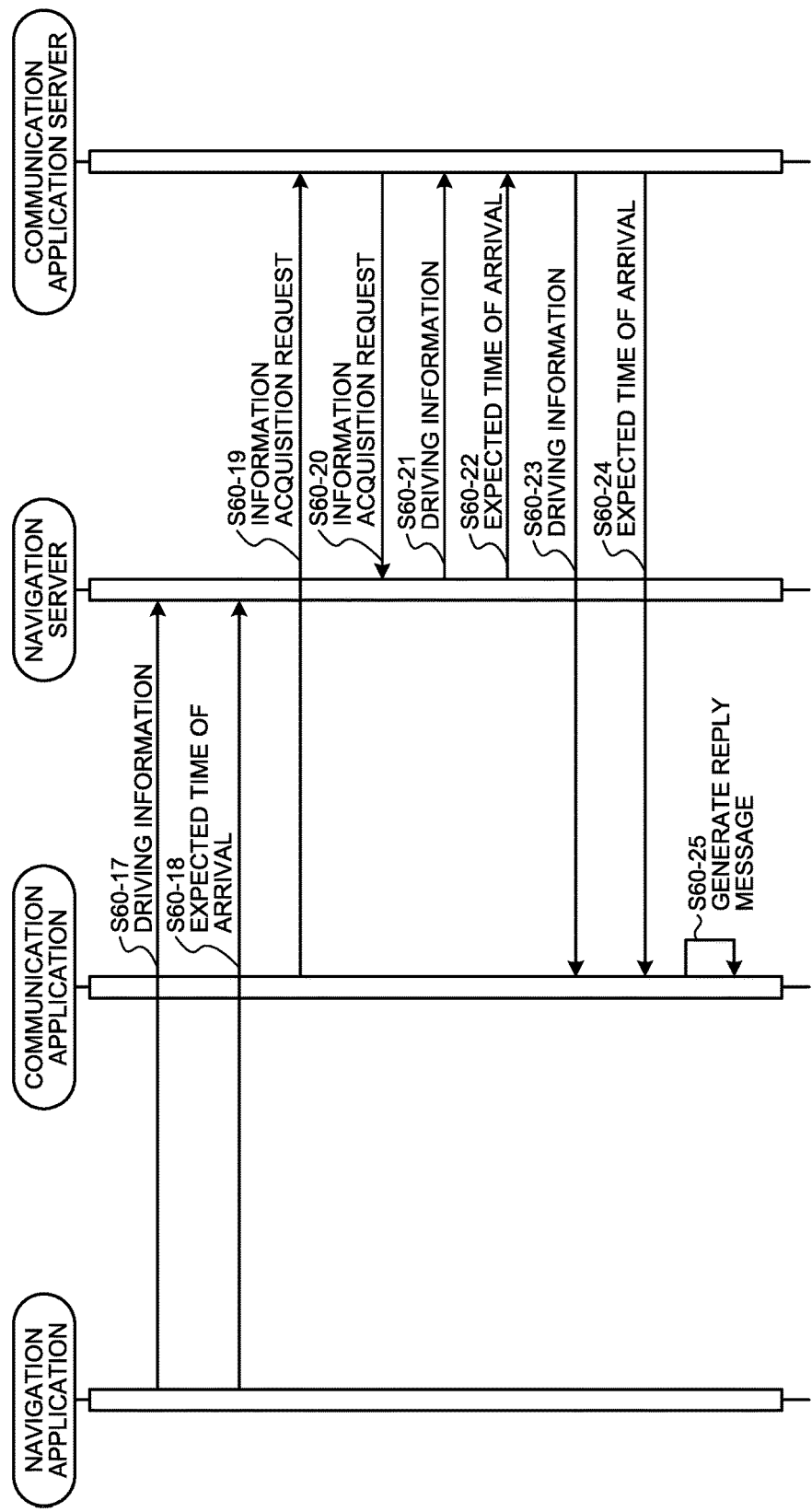

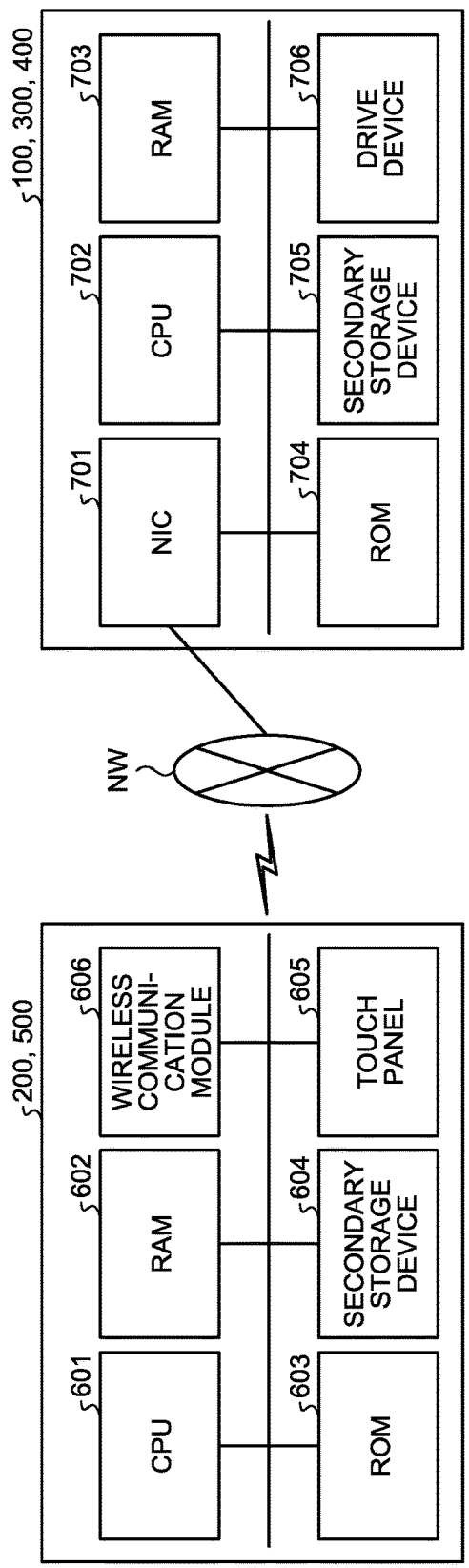

TERMINAL DEVICE, NON-TRANSITORY COMPUTER READABLE STORAGE MEDIUM, AND INSURANCE CONDITION DETERMINATION DEVICE

CROSS-REFERENCE TO RELATED APPLICATION(S)

The present application claims priority to and incorporates by reference the entire contents of Japanese Patent Application No. 2016-055710 filed in Japan on Mar. 18, 2016.

BACKGROUND OF THE INVENTION

1. Field of the Invention

The present invention relates to a terminal device, a non-transitory computer readable storage medium, and an insurance condition determination device.

2. Description of the Related Art

Conventionally, a technology to permit execution of an application regarding driving of a vehicle and prohibiting execution of other application, in order to avoid impairment of safety due to a driver operating a terminal while driving a vehicle, is disclosed (see JP 2014-233998 A).

However, the technology disclosed in JP 2014-233998 A cannot use the prohibited application and thus is inconvenient. Meanwhile, if use of the application during driving of the vehicle is permitted, and when a message arrives at the application having a transmission function and a reception function of the message, the driver replying to the message while driving the vehicle is unfavorable for safety reasons.

One aspect of the present invention is a terminal device including a first execution unit configured to execute a first application having a navigation function for a user in a vehicle, and a second execution unit configured to execute a second application having a transmission function and a reception function of a message, wherein the second execution unit automatically replies to the message in cooperation with the first application, when the second execution unit receives the message to the second application while the vehicle is being driven.

SUMMARY OF THE INVENTION

It is an object of the present invention to at least partially solve the problems in the conventional technology.

According to one aspect of an embodiment, a terminal device includes a first execution unit that executes a first application having a navigation function for a user in a vehicle, and a second execution unit that executes a second application having a transmission function and a reception function of a message. The second execution unit automatically replies to the message in cooperation with a first information processing device that controls operation of the first execution unit and/or the first application, when the second execution unit receives the message to the second application while the vehicle is being driven.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a configuration diagram of a system including an insurance condition determination device according to a first embodiment;

FIG. 2 is a diagram illustrating an example of content of map information;

FIG. 3 is a sequence diagram illustrating a flow of processing executed in the system including the insurance condition determination device according to the first embodiment;

FIG. 19 is a diagram specifically illustrating reply message generation processing of S60 in a seventh embodiment; and FIG. 20 is a diagram illustrating an example of hardware configurations of a navigation server, a terminal device, an insurance company server, a communication application server, and a terminal device.

DETAILED DESCRIPTION OF THE PREFERRED EMBODIMENTS

Figure 4:
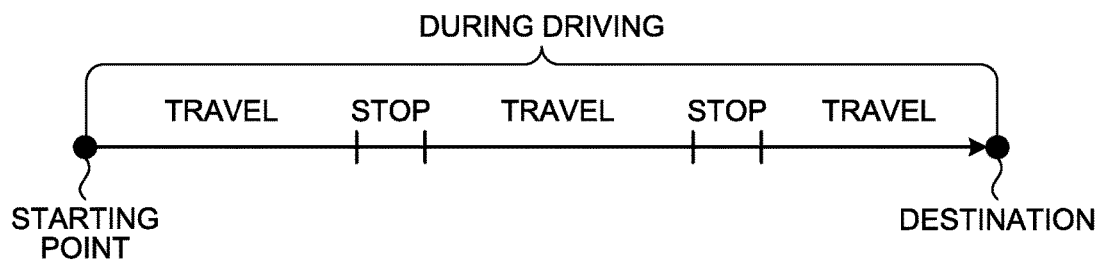
FIG. 4 is a diagram illustrating an example of a period in which a vehicle is being driven.

Hereinafter, embodiments of a terminal device, a program, and an insurance condition determination device of the present embodiment will be described with reference to the drawings.

1. First Embodiment 1-1. Configuration

FIG. 1 is a configuration diagram of a system including an insurance condition determination device according to a first embodiment. The insurance condition determination device of the embodiment is realized by one or more processors. The insurance condition determination device of the embodiment includes at least an insurance company server 300, and may include a navigation server 100. The insurance company server 300 may be integrated into the navigation server 100, or the navigation server 100 and the insurance company server 300 may be integrated to configure the insurance condition determination device. FIG. 1 illustrates only one vehicle Vh and one terminal device 200. However, a plurality of the terminal devices 200 may be connected to a network NW.

The terminal device 200, the navigation server 100, and the insurance company server 300 communicate through the network NW. The network NW includes, for example, a part or all of a wide area network (WAN), a local area network (LAN), the Internet, a provider device, a wireless base station, and a special line.

The terminal device 200 is used by a user in the vehicle Vh. The terminal device 200 is a mobile phone such as a smart phone, a tablet terminal, or the like. The terminal device 200 functions as a navigation device that configures a part of a navigation system upon start of a navigation application in cooperation with the navigation server 100. Note that a navigation device (a stationary in-vehicle device) may be mounted in the vehicle Vh. Alternatively, the stationary in-vehicle device may be treated as the terminal device 200.

The terminal device 200 includes a position measuring device such as a global positioning system (GPS) receiver, a communication device for being connected to the network NW, a trixial acceleration sensor, an input/output device such as a touch panel, a speaker, a processor such as a central processing unit (CPU), and the like. The position measuring device performs measurement based on radio waves received from a satellite to identify a position of the terminal device 200 (that is, a position of the vehicle Vh). Further, the terminal device 200 may estimate the position of the terminal device 200 from a position of a wireless base station to which the communication device is connected.

The terminal device 200 transmits the position of the terminal device 200 identified by the position measuring device or the like to the navigation server 100 on a periodic basis (at intervals of several [sec], for example). Further, the terminal device 200 transmits a destination set by the user to the navigation server 100 and acquires a route.

The navigation server 100 includes a route search unit 110. The route search unit 110 may be realized by the processor of the navigation server 100 executing a program, or may be realized by hardware (a controller) such as a large scale integration (LSI), an application specific integrated circuit (ASIC), or a field-programmable gate array (FPGA). The route search unit 110 performs route search in response to a request from the terminal device 200, and transmits route information to the terminal device 200. Further, map information 120 is stored in a storage unit of the navigation server 100. The map information 120 is information that expresses roads by aggregation of links, for example.

FIG. 2 is a diagram illustrating an example of content of the map information 120. The map information 120 is information in which information of coordinates of both ends of a link, a connection link, and the number of lanes is associated with a link ID that is identification information of the link.

The navigation server 100 extracts, from the map information 120, map information (partial map information) of an area around the position of the terminal device 200 received from the terminal device 200, and transmits the extracted map information to the terminal device 200.

The terminal device 200 performs map matching processing for the information received from the navigation server 100. The map matching processing is processing of judging which element the terminal device 200 moves along (that is, which link the vehicle Vh travels in), of elements (for example, the links) included in the map information (including the case of the partial map information), and elements (for example, polygons) other than the links included in the map information may be included in matching targets, or the map information may include elements other than the matching targets. Typically, in a case of the links, the position of the terminal device 200 (the position of the vehicle Vh) is associated with any link. The map matching processing is performed by selection of the link in a position closest to the position of the terminal device 200 in consideration of various elements. The terminal device 200 generates a navigation screen on the basis of the partial map information received from the navigation server 100 and a result of the map matching processing, and displays the screen together with audio guidance.

The insurance company server 300 is operated by an insurance company, for example. The insurance company server 300 includes an insurance condition determination unit 310 and a judgment unit 320. The insurance condition determination unit 310 and the judgment unit 320 may be realized by the processor of the insurance company server 300 executing a program, or may be realized by hardware such as an LSI, an ASIC, or an FPGA.

The insurance condition determination unit 310 determines insurance conditions for the vehicle Vh, or each user who drives the vehicle Vh. In the present embodiment, an insurance provided by the insurance company that operates the insurance company server 300 is an insurance in which the insurance conditions are determined according to the length (travel distance) of a traveled route, and an insurance fee is determined such that 100 yen is charged in every travel distance of 100 [km]. Then, as for the insurance conditions of this insurance, (A) the insurance conditions are determined ex post facto according to the route where the vehicle Vh has traveled, or (B) the insurance conditions in the next period are determined according to the route where the vehicle Vh has traveled in a fixed period. The insurance conditions include an insurance fee, a deductible, a variable amount of the insurance fee associated with payment of insurance money (a variable amount of a class), and other various conditions. The information of the traveled route may be acquired through the navigation application and the navigation server 100, or may be acquired in a manner such that an application provided by the insurance company is executed in the terminal device 200, and the position identified by the position measuring device of the terminal device 200 is transmitted to the insurance company server 300. Further, the information of the traveled route may be acquired from the terminal device 200 as an in-vehicle device.

Although details will be described below, the judgment unit 320 judges, in a case where a predetermined application (application program) is executed in the terminal device 200 held by the user in the vehicle Vh, whether an operation to the predetermined application is inappropriate. Further, although details will be described below, the insurance condition determination unit 310 determines the insurance conditions for the vehicle Vh or the user on the basis of a judgment result of the judgment unit 320.

Storage units of the navigation server 100 and the insurance company server 300 (hereinafter, "the servers") are realized by, for example, a random access memory (RAM), a read only memory (ROM), a hard disk drive (HDD), a flash memory, or the like. Further, the storage units are not limited to storage devices held by the servers, and may be realized by an external storage device such as a network attached storage (NAS).

1-2. Example of Processing

FIG. 3 is a sequence diagram illustrating a flow of processing executed in the system including the insurance condition determination device according to the first embodiment.

1-3. Processing of Navigation

First, the navigation application is started in the terminal device 200, and the terminal device 200 receives setting of the destination by the user (S1). The terminal device 200 transmits the position of the terminal device 200 (hereinafter, "the position of the own device") identified by the position measuring device and the destination to the navigation server 100 (S2). The navigation server 100 performs the route search, using the position and the destination, and the map information 120 (S3). The navigation server 100 transmits a route as a search result and the partial map information of the area around the position of the terminal device 200 to the terminal device 200 (S4).

The terminal device 200 determines that driving of the vehicle Vh has been started on the basis of the position identified by the position measuring device. When the terminal device 200 determines that the driving of the vehicle Vh has been started, the terminal device 200 transmits a driving start notification to the insurance company server 300 (S5). Note that the terminal device 200 may determine that the driving of the vehicle Vh has been started on the basis of an input from the user.

The terminal device 200 performs the map matching processing for the position of the own device and the link included in the partial map information, generates the navigation screen on the basis of the result of the map matching processing (hereinafter, "map matching result") and the partial map information, and displays the navigation screen together with audio information (S6).

The terminal device 200 transmits the position of the own device and the map matching result to the navigation server 100 on a periodic basis (S7). The navigation server 100 transmits the position of the own device and the map matching result to the insurance company server 300 (S8). The insurance company server 300 stores the received position of the own device and the received map matching result to the storage unit (S9). As described above, the navigation server 100 and the insurance company server 300 may be integrated and function as a "navigation/insurance company server", and in this case, the navigation/insurance company server stores the map matching result received from the terminal device 200 to the storage unit. The navigation server 100 transmits the partial map information corresponding to the position to the terminal device 200 (S10).

1-4. Detection and Judgement of Application Operation

When the terminal device 200 detects an application operation by the user, the terminal device 200 transmits, to the navigation server 100, application operation information that indicates operation content to the application (S11). Further, the navigation server 100 transmits the application operation information received from the terminal device 200 to the insurance company server 300 (S12).

The insurance company server 300 executes judgment processing of judging whether the operation to the application is inappropriate (S13) when receiving the application operation information from the navigation server 100. For example, the judgment unit 320 of the insurance company server 300 judges whether the operation to the application is inappropriate on the basis of whether the vehicle is being driven. In a case where the vehicle Vh is not being driven, the safety is not impaired even if the user operates the application, and thus the judgment unit 320 judges that the operation to the application is not inappropriate (is appropriate).

FIG. 4 is a diagram illustrating an example of a period in which the vehicle Vh is being driven. As illustrated in FIG. 4, the judgment unit 320 judges that the vehicle Vh is being driven from when the vehicle Vh starts from the starting point to when the vehicle Vh arrives at the destination. To be specific, the judgment unit 320 judges that the vehicle Vh is being driven from when the judgment unit 320 has received the driving start notification in S5 to when the judgment unit 320 receives a destination arrival notification in S15. Note that, in the period during driving of the vehicle Vh, the vehicle Vh repeats traveling and stop. During this stop is considered as "the period during driving". In a case where a period during stop exceeds a reference time, the judgment unit 320 may judge that the period is not "the period during driving".

Further, the judgment unit 320 judges whether the operation to the application is inappropriate on the basis of an established state of the matching between the position of the vehicle Vh and link data of a road in the map information. In a case where the matching is not established, the vehicle Vh is estimated not to exist on the road, and thus the judgment unit 320 judges that the operation to the application is not inappropriate (is appropriate).

Note that the judgment unit 320 may judge whether the operation to the application is inappropriate on the basis of reliability of the matching. For example, the judgment unit 320 may calculate the reliability on the basis of a distance between the position of the vehicle Vh and the position of the road closest to the vehicle Vh, in the link data included in the map information. In this case, the reliability of the matching becomes higher as the distance between the position of the vehicle Vh and the position of the road closest to the vehicle Vh is shorter. Note that the terminal device 200 may calculate the reliability, and transmit the calculated reliability in addition to the map matching result. In this case, the judgment unit 320 may judge whether the operation to the application is inappropriate on the basis of the reliability added to the map matching result received from the terminal device 200. Further, the navigation server 100 may calculate the reliability, and the judgment unit 320 of the insurance company server 300 may receive the reliability from the navigation server 100.

Note that the judgment unit 320 may judge that matching is not established even if the matching is established in a case where the distance between the position of the vehicle Vh and the position of the road closest to the vehicle Vh in the link data included in the map information exceeds a predetermined distance.

Figure 5:
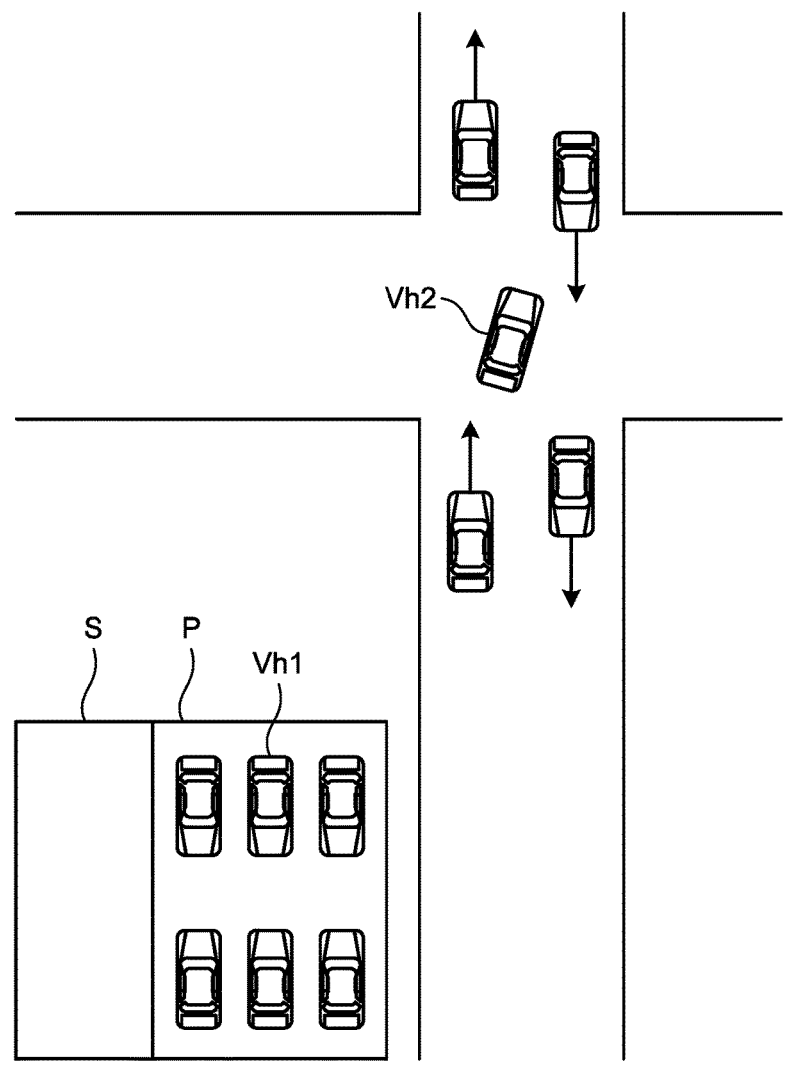
FIG. 5 is a diagram illustrating an example of a vehicle stopping at a safe position and a vehicle stopping at an unsafe position.

Further, the judgment unit 320 judges that the operation to the application is not inappropriate (is appropriate) in a case where the vehicle Vh stops at a safety position. FIG. 5 is a diagram illustrating an example of the vehicle Vh1 stopping at a safe position and a vehicle Vh2 stopping at an unsafe position. As illustrated in FIG. 5, the vehicle Vh1 stops at a parking space P of a shop S facing the road, and thus the judgment unit 320 judges that the vehicle Vh1 stops at a safe position. Meanwhile, the vehicle Vh2 stops to turn right at an intersection, and thus the judgment unit 320 judges that the vehicle Vh2 does not stop at a safe position.

For example, the judgment unit 320 may judge whether the vehicle Vh stops at a safe position on the basis of probe information collected from vehicles. The probe information includes speed information of the vehicles. The navigation server 100 collects the probe information from the terminal devices of the vehicles, and the judgment unit 320 of the insurance company server 300 requests the navigation server 100 of the probe information. For example, the judgment unit 320 judges that the vehicle Vh stops at a safe position when an average value of the speeds of the plurality of vehicles existing near the vehicle Vh is less than a predetermined value on the basis of the probe information received from the navigation server 100. The judgment unit 320 stores a judgment result in the storage unit. The storage unit accumulates the judgment result as history data.

In this way, the processing of S6 to S13 is repeatedly executed. The terminal device 200 determines whether the vehicle Vh has arrived at the destination on the basis of the position identified by the position measuring device. When the terminal device 200 determines that the vehicle Vh has arrived at the destination, the terminal device 200 transmits the destination arrival notification to the navigation server 100 (S14). The navigation server 100 transmits the destination arrival notification received from the terminal device 200 to the insurance company server 300 (S15). Note that the terminal device 200 may determine that the vehicle Vh has arrived at the destination on the basis of an input from the user.

1-5. Determination of Insurance Condition

After that, the insurance company server 300 determines the insurance conditions for the vehicle Vh or the user on the basis of the judgment result in the judgment processing of S13 (S16). In a case where the operation to the application is determined to be inappropriate, a possibility of occurrence of an accident is considered to be increased. Therefore, the insurance condition determination unit 310 of the insurance company server 300 determines the insurance conditions such that the insurance fee becomes higher as a ratio of an inappropriate operation judged by the judgment unit 320 is higher. For example, the insurance condition determination unit 310 changes the insurance conditions according to the ratio of the inappropriate operation at every time of driving.

1-6. Processing by Insurance Company Server

Figure 6:
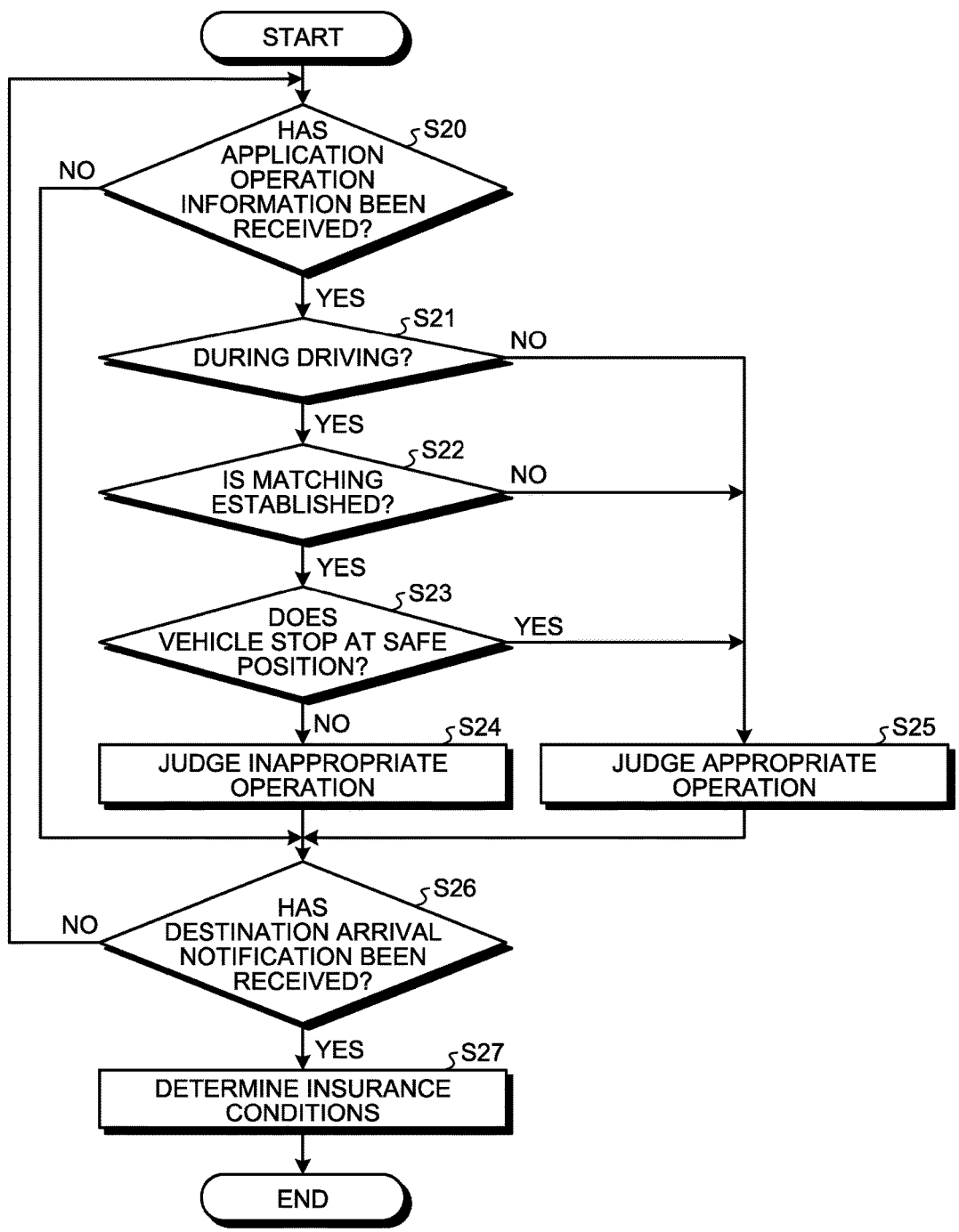
FIG. 6 is a flowchart illustrating an example of a flow of processing executed by an insurance company server in the first embodiment.

FIG. 6 is a flowchart illustrating an example of a flow of processing executed by the insurance company server 300 in the first embodiment. The insurance company server 300 executes processing of the flowchart illustrated in FIG. 6 when receiving the driving start notification from the terminal device 200.

First, the judgment unit 320 of the insurance company server 300 judges whether the judgment unit 320 has received the application operation information from the terminal device 200 (S20). When the judgment unit 320 judges that the judgment unit 320 has not received the application operation information from the terminal device 200, the judgment unit 320 proceeds to the processing of S26 described below. Meanwhile, when judgment unit 320 judges that the judgment unit 320 has received the application operation information from the terminal device 200, the judgment unit 320 judges whether the user is driving the vehicle Vh (S21).

When the judgment unit 320 judges that the user is not driving the vehicle Vh, the judgment unit 320 proceeds to the processing of S25 described below. Meanwhile, when judgment unit 320 judges that the user is driving the vehicle Vh, the judgment unit 320 judges whether matching between the position of the vehicle Vh, and the link data of the road in the map information is established (S22).

When the judgment unit 320 judges that the matching is not established, the judgment unit 320 proceeds to the processing of S25 described below. Meanwhile, when the judgment unit 320 judges that the matching is established, the judgment unit 320 judges whether the vehicle Vh stops at a safe position (S23).

When the judgment unit 320 judges that the vehicle Vh stops at a safe position, the judgment unit 320 proceeds to the processing of S25 described below. Meanwhile, when the judgment unit 320 judges that the vehicle Vh does not stop at a safe position, the judgment unit 320 judges that the operation to the application is inappropriate, and stores the judgment result to the storage unit (S24).

Meanwhile, when the judgment unit 320 judges that the user is not driving the vehicle Vh in S21, when the judgment unit 320 judges that the matching is not established in S22, or when the judgment unit 320 judges that the vehicle Vh stops at a safe position in S23, the judgment unit 320 judges that the operation to the application is appropriate, and stores the judgment result to the storage unit (S25).

After that, the judgment unit 320 judges whether receiving the destination arrival notification (S26). When the judgment unit 320 judges that the judgment unit 320 has not received the destination arrival notification, the judgment unit 320 returns to the processing of S20 described above. Meanwhile, when the judgment unit 320 judges that the judgment unit 320 has received the destination arrival notification, the insurance condition determination unit 310 determines the insurance conditions on the basis of the history of the judgment results stored in the storage unit (S27), and terminates the processing by the present flowchart.

1-7. Effect

As described above, the insurance condition determination device of the first embodiment includes the judgment unit 320 that judges, in a case where a predetermined application is executed in the terminal device 200 held by the user in the vehicle Vh, whether an operation to the predetermined application is inappropriate, and the insurance condition determination unit 310 that determines the insurance conditions for the vehicle Vh or the user on the basis of the judgment result of the judgment unit 320. Accordingly, the insurance condition termination device of the first embodiment can appropriately determine the insurance conditions for the vehicle or the user.

2. Second Embodiment

In the first embodiment, the insurance company server 300 has judged whether the operation to the application is inappropriate, and has determined the insurance conditions for the vehicle Vh or the user. In contrast, in a second embodiment, a terminal device 200 judges whether an operation to an application is inappropriate, and restrains the operation to the application when the operation is inappropriate. Hereinafter, the second embodiment will be described.

Figure 7:
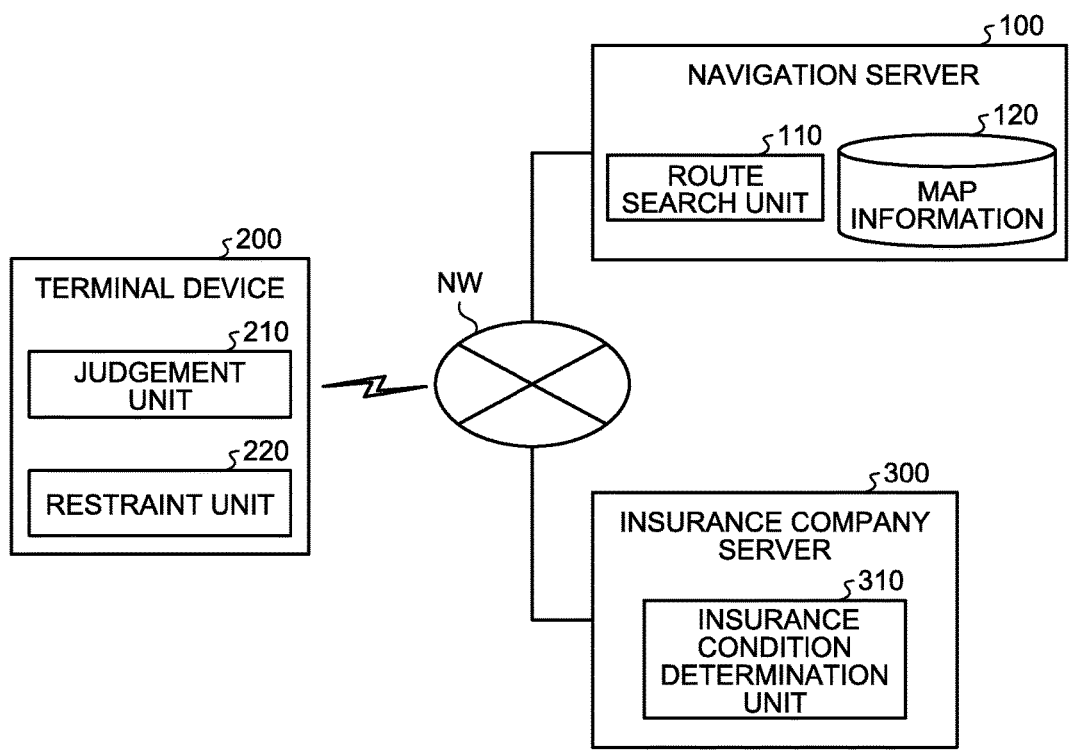
FIG. 7 is a configuration diagram of a system including an insurance condition determination device according to a second embodiment.

FIG. 7 is a configuration diagram of a system including an insurance condition determination device according to the second embodiment. In FIG. 7, portions corresponding to the respective units of FIG. 1 are denoted with the same reference signs, and description is omitted. In the second embodiment, the terminal device 200 includes a judgment unit 210 and a restraint unit 220.

The judgment unit 210 judges, in a case where a predetermined application (application program) is executed in a state where the terminal device 200 is held by a user in a vehicle Vh, whether an operation to the predetermined application is inappropriate. Processing of judging whether the operation to the predetermined application is inappropriate is similar to that of the first embodiment, and thus description is omitted.

The restraint unit 220 restrains the operation to the application when the operation to the application is judged to be inappropriate by the judgment unit 210. Accordingly, impairment of safety due to the user operating the application can be prevented in advance. Note that the restraint unit 220 may completely prohibit the operation to the application, or may prohibit only the operation to a part of the application.

Figure 8:
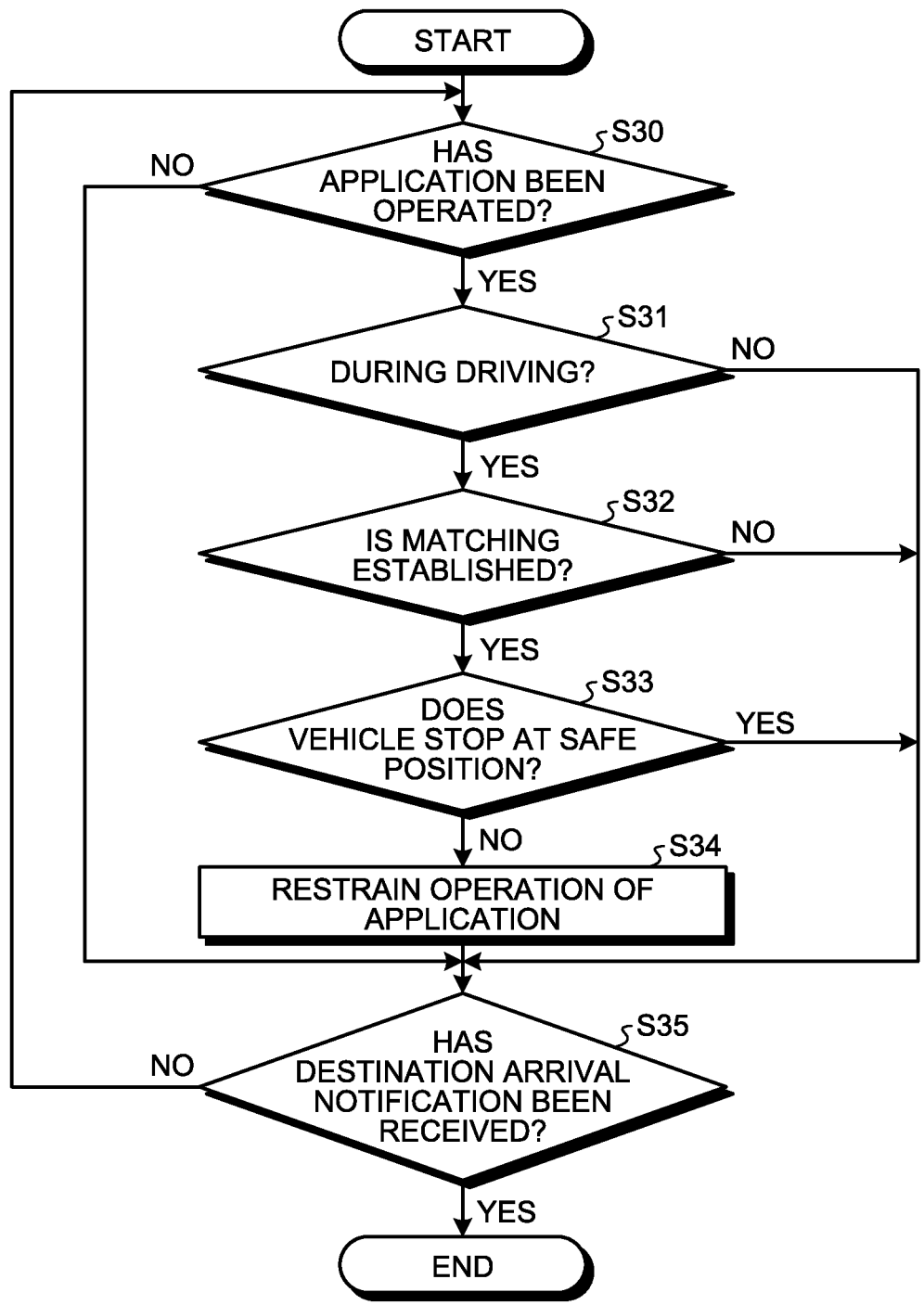
FIG. 8 is a flowchart illustrating an example of a flow of processing executed by a terminal device in the second embodiment.

FIG. 8 is a flowchart illustrating an example of a flow of processing executed by the terminal device 200 in the second embodiment. The terminal device 200 determines that driving of the vehicle Vh has been started on the basis of a position (a position of the vehicle Vh) identified by a position measuring device. When the driving of the vehicle Vh is started, the terminal device 200 executes processing of the flowchart illustrated in FIG. 8. The terminal device 200 may determine that the driving of the vehicle Vh has been started on the basis of an input from the user.

First, the judgment unit 210 of the terminal device 200 judges whether the application is operated (S30). When the judgment unit 210 judges that the application is not operated, the judgment unit 210 proceeds to the processing of S35 described below. Meanwhile, when the judgment unit 210 judges that the application is operated, the judgment unit 210 judges whether the user is driving the vehicle Vh (S31). A method of judging whether the user is driving the vehicle Vh is similar to that of the first embodiment.

When the judgment unit 210 judges that the user is not driving the vehicle Vh, the judgment unit 210 proceeds to the processing of S35 described below. Meanwhile, when the judgment unit 210 judges that the user is driving the vehicle Vh, the judgment unit 210 judges whether matching between the position of the vehicle Vh, and link data of a road in map information is established (S32). A method of judging whether the matching is established is similar to that of the first embodiment.

When the judgment unit 210 judges that the matching is not established, the judgment unit 210 proceeds to the processing of S35 described below. Meanwhile, when the judgment unit 210 judges that the matching is established, the judgment unit 210 judges whether the vehicle Vh stops at a safe position (S33). A method of judging whether the vehicle Vh stops at a safe position is similar to that of the first embodiment.

When the judgment unit 210 judges that the vehicle Vh stops at a safe position, the judgment unit 210 proceeds to the processing of S35 described below. Meanwhile, when the judgment unit 210 judges that the vehicle Vh does not stop at a safe position, the judgment unit 210 judges that the operation to the application is inappropriate. In this case, the restraint unit 220 restrains the operation to the application (S34).

Meanwhile, when the judgment unit 210 judges in S31 that the user is not driving the vehicle Vh, when the judgment unit 210 judges in S32 that the matching is not established, or when the judgment unit 210 judges in S33 that the vehicle Vh stops at a safe position, the judgment unit 210 judges that the operation to the application is appropriate. Therefore, the restraint unit 220 does not restrain the operation to the application.

After that, the judgment unit 210 judges whether receiving a destination arrival notification (S35). When the judgment unit 210 judges that the judgment unit 210 has not yet received the destination arrival notification, the judgment unit 210 returns to the processing of S30 described above. Meanwhile, when judgment unit 210 judges that the judgment unit 210 has received the destination arrival notification, the judgment unit 210 terminates the processing by the present flowchart.

As described above, the terminal device 200 of the second embodiment includes the judgment unit 210 that judges, in a case where the predetermined application is executed in a state where the terminal device is held by the user in the vehicle Vh, whether the operation to the predetermined application is in appropriate, and the restraint unit 220 that restrains the operation to the predetermined operation when the operation is judged to be inappropriate by the judgment unit 210. Accordingly, the terminal device 200 of the second embodiment can avoid the impairment of safety due to the user operating the application.

3. Third Embodiment

In the second embodiment, the terminal device 200 has judged whether the operation to the application is inappropriate, and has restrained the operation to the application when the operation is inappropriate. In contrast, in a third embodiment, an insurance company server 300 as an information processing device judges whether an operation to an application is inappropriate, and causes a terminal device 200 to restraint execution of the application when the operation is inappropriate. Hereinafter, the third embodiment will be described.

Figure 9:
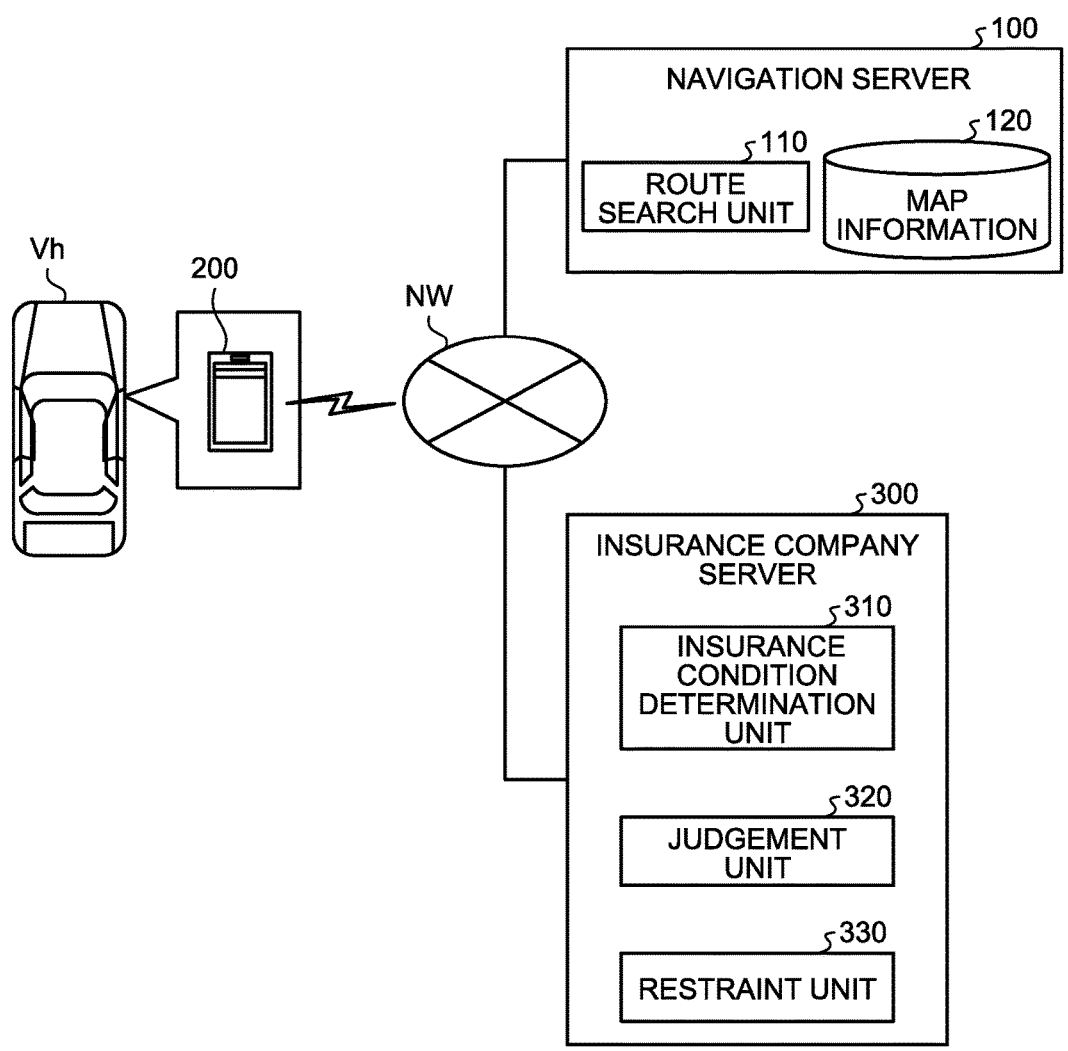
FIG. 9 is a configuration diagram of a system including an insurance condition determination device according to a third embodiment.

FIG. 9 is a configuration diagram of a system including an insurance condition determination device according to the third embodiment. In FIG. 9, portions corresponding to the respective units of FIG. 1 are denoted with the same reference signs, and description is omitted. In the third embodiment, the insurance company server 300 further includes a restraint unit 330.

The judgment unit 320 judges, in a case where a predetermined application (application program) is executed in a terminal device 200 held by a user in a vehicle Vh, whether an operation to the predetermined application is inappropriate. Processing of judging whether the operation to the predetermined application is inappropriate is similar to that of the first embodiment, and thus description is omitted.

The restraint unit 330 causes the terminal device 200 to restrain execution of the application when the operation to the application is judged to be inappropriate by the judgment unit 320. Accordingly, impairment of safety due to the user operating the application can be avoided. Note that the restraint unit 330 may completely prohibit the operation to the application, or may prohibit only an operation to a part of the application.

Figure 10:
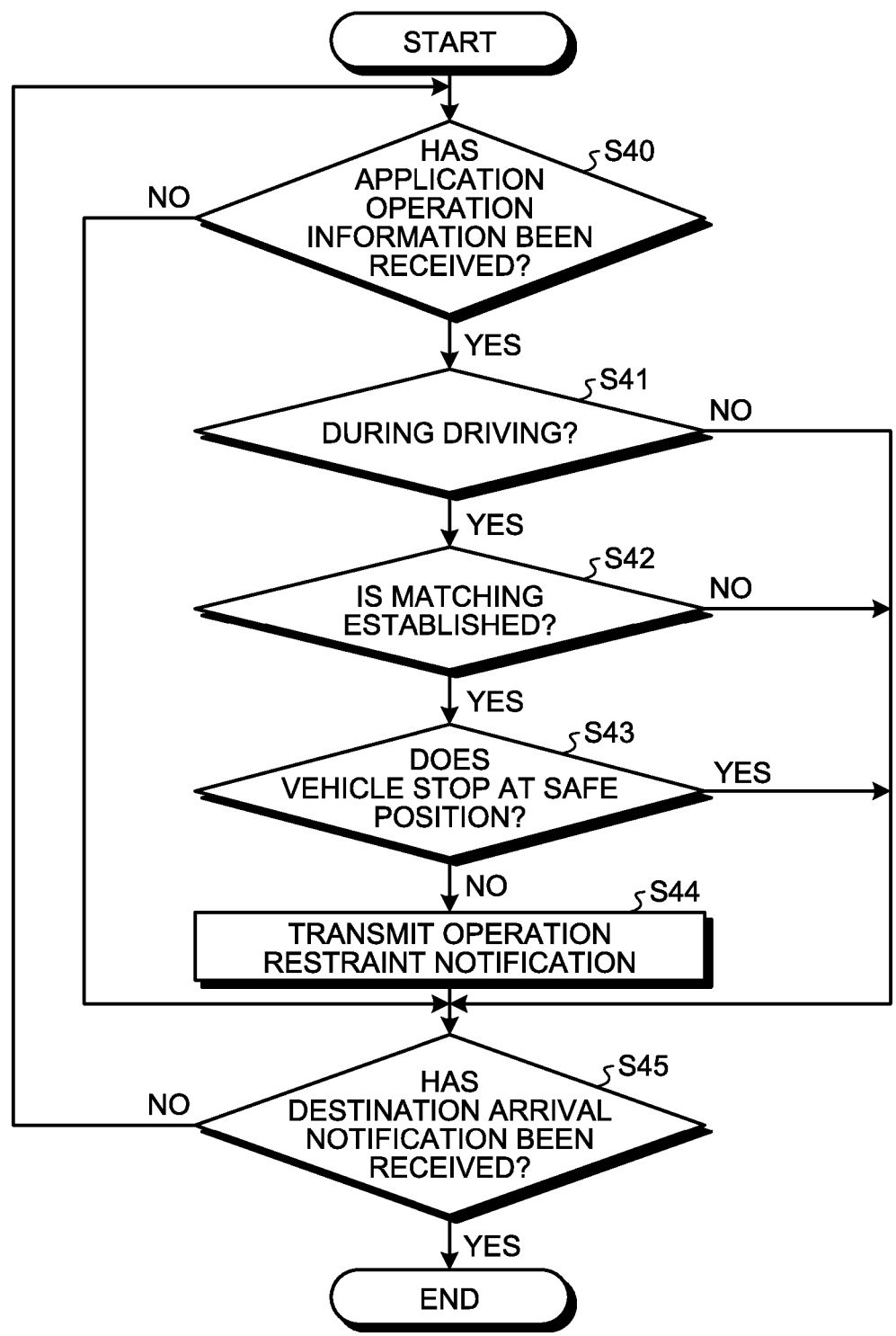
FIG. 10 is a flowchart illustrating an example of a flow of processing executed by an insurance company server in the third embodiment.

FIG. 10 is a flowchart illustrating an example of a flow of processing executed by the insurance company server 300 in the third embodiment. The insurance company server 300 executes processing of the flowchart illustrated in FIG. 10 when receiving a driving start notification from the terminal device 200.

First, the judgment unit 320 of the insurance company server 300 judges whether receiving application operation information from the terminal device 200 (S40). When the judgment unit 320 judges that the judgment unit 320 has not received the application operation information from the terminal device 200, the judgment unit 320 proceeds to the processing of S45 described below. Meanwhile, when the judgment unit 320 judges that the judgment unit 320 has received the application operation information from the terminal device 200, the judgment unit 320 judges whether the user is driving the vehicle Vh (S41). A method of judging whether the user is driving the vehicle Vh is similar to that of the first embodiment.

When the judgment unit 320 judges that the user is not driving the vehicle Vh, the judgment unit 320 proceeds to the processing of S45 described below. Meanwhile, when the judgment unit 320 judges that the user is driving the vehicle Vh, the judgment unit 320 judges whether matching between a position of the vehicle Vh, and link data of a road in map information is established (S42). A method of judging whether the matching is established is similar to that of the first embodiment.

When the judgment unit 320 judges that the matching is not established, the judgment unit 320 proceeds to the processing of S45 described below. Meanwhile, when the judgment unit 320 judges that the matching is established, the judgment unit 320 judges whether the vehicle Vh stops at a safe position (S43). A method of judging whether the vehicle Vh stops at a safe position is similar to that of the first embodiment.

When the judgment unit 320 judges that the vehicle Vh stops at a safe position, the judgment unit 320 proceeds to the processing of S45 described below. Meanwhile, when the judgment unit 320 judges that the vehicle Vh does not stop at a safe position, the judgment unit 320 judges that the operation to the application is inappropriate. In this case, the restraint unit 330 transmits an operation restraint notification to the terminal device 200 (S44). The terminal device 200 restrains the operation to the application when receiving the operation restraint notification from the insurance company server 300.

Meanwhile, when the judgment unit 320 judges in S41 that the user is not driving the vehicle Vh, when the judgment unit 320 judges in S42 that the matching is not established, or when the judgment unit 320 judges in S43 that the vehicle Vh stops at a safe position, the judgment unit 320 judges that the operation to the application is appropriate. Therefore, the restraint unit 330 does not transmit the operation restraint notification to the terminal device 200.

After that, the judgment unit 320 judges whether receiving a destination arrival notification (S45). When judgment unit 320 judges that the judgment unit 320 has not received the destination arrival notification, the judgment unit 320 returns to the processing of S40 described above. Meanwhile, when the judgment unit 320 judges that the judgment unit 320 has received the destination arrival notification, the judgment unit 320 terminates the processing by the present flowchart.

As described above, the information processing device of the third embodiment includes the judgment unit 320 that judges, in a case where the predetermined application (application program) is executed in the terminal device 200 held by the user in the vehicle Vh, whether the operation to the predetermined application is inappropriate, and the restraint unit 330 that causes the terminal device 200 to restrain execution of the application when the operation is judged to be inappropriate by the judgment unit 320. Accordingly, the information processing device of the third embodiment can avoid impairment of safety due to the user operating the application.

4. Fourth Embodiment

In the first to third embodiments, the terminal device 200 has executed the navigation application. In contrast, in a fourth embodiment, a terminal device 200 executes not only a navigation application, but also a communication application (communication tool) having a transmission function and a reception function of a message. Hereinafter, the fourth embodiment will be described.

4-1. Configuration

Figure 11:
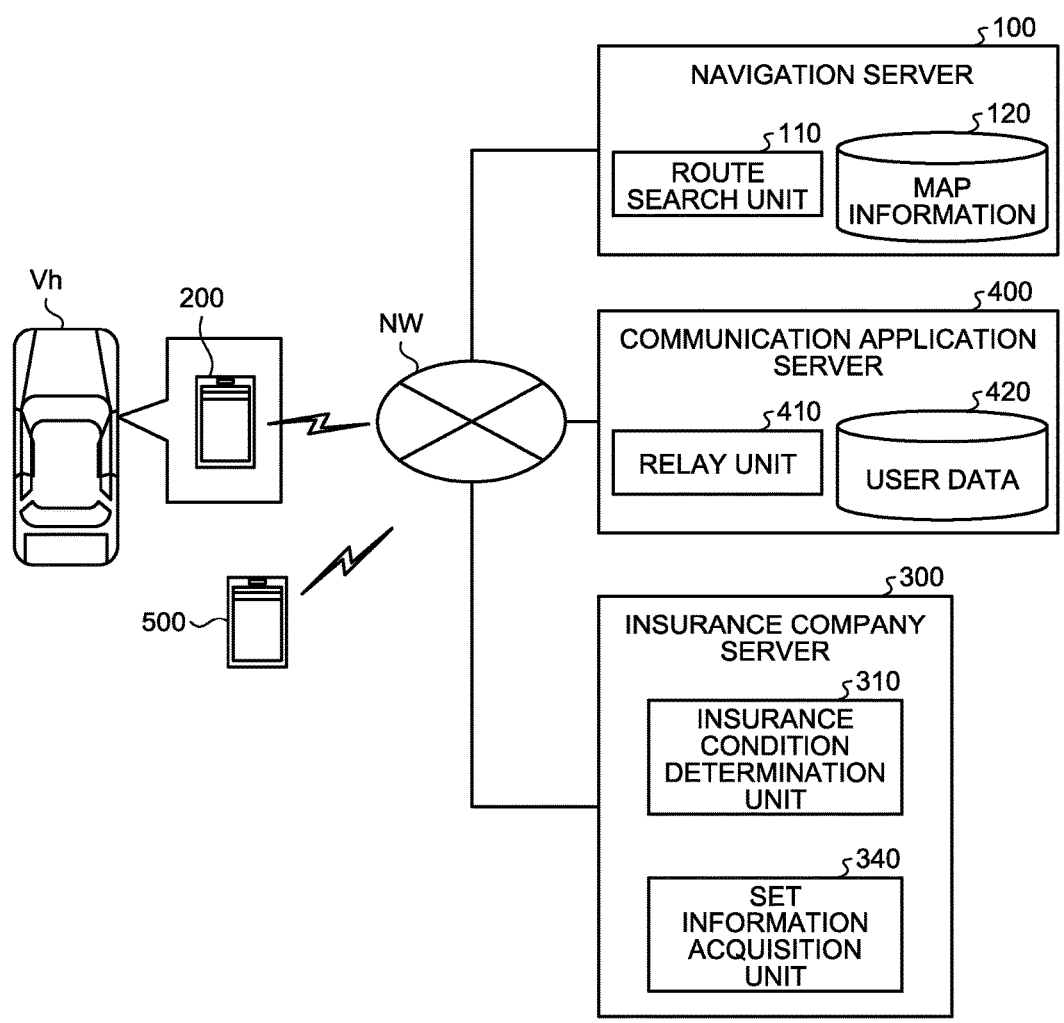
FIG. 11 is a configuration diagram of a system according to a fourth embodiment.

FIG. 11 is a configuration diagram of a system according to the fourth embodiment. In FIG. 11, portions corresponding to the respective units of FIG. 1 are denoted with the same reference signs, and description is omitted. In the fourth embodiment, a communication application server 400 is connected to a network NW. A terminal device 500 is a mobile phone such as a smart phone or a tablet terminal.

The communication application server 400 includes a relay unit 410. The relay unit 410 may be realized by a processor of the communication application server 400 executing a program, or may be realized by hardware such as an LSI, an ASIC, or an FPGA. Further, a storage unit of the communication application server 400 stores user data 420. The user data 420 is data in which identification information of a terminal device connectable to the communication application server 400 and an address of the terminal device are associated with each other.

For example, when the relay unit 410 receives a message from the terminal device 200 or the terminal device 500, the relay unit 410 acquires the address corresponding to the identification information of the terminal device of a destination of the message by reference to the user data 420. After that, the relay unit 410 transmits the received message to the terminal device corresponding to the acquired address. Accordingly, the terminal device 500 can transmit a message to the terminal device 200 through the communication application server 400, and can receive a message from the terminal device 200 through the communication application server 400.

Further, an insurance company server 300 includes a set information acquisition unit 340 that acquires set information from the terminal device 200. Although details will be described below, the set information is information indicating whether an automatic reply function to automatically reply to a received message is set. The set information acquisition unit 340 may be realized by a processor of the communication application server 400 executing a program, or may be realized by hardware such as an LSI, an ASIC, or an FPGA.

Figure 12:
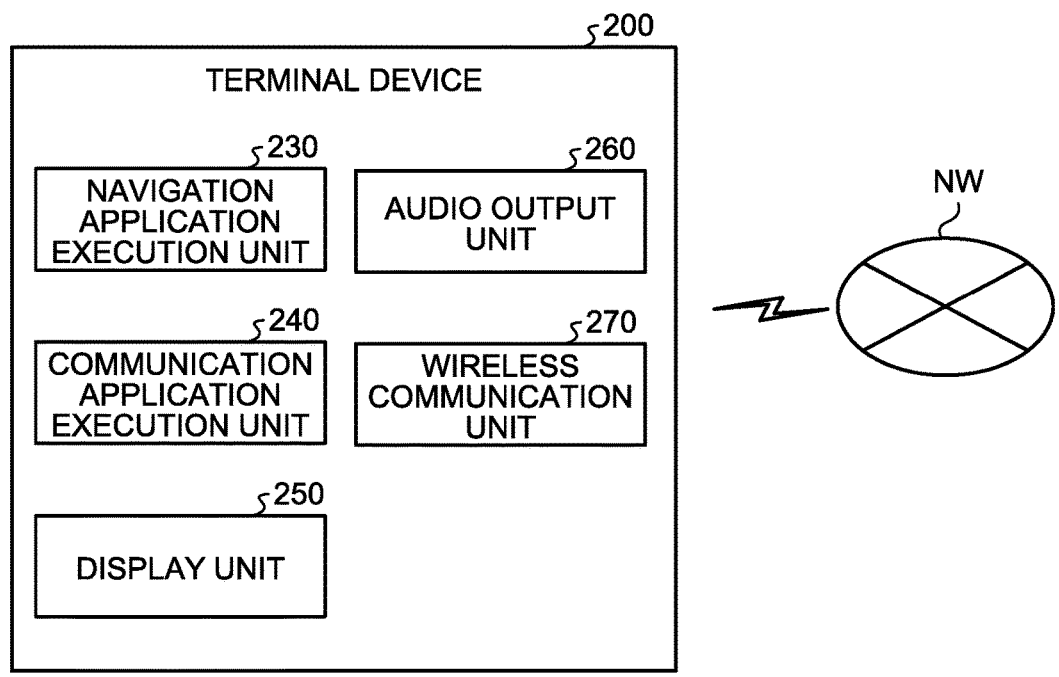
FIG. 12 is a block diagram of a terminal device according to the fourth embodiment.

FIG. 12 is a block diagram of the terminal device 200 according to the fourth embodiment. The terminal device 200 includes a navigation application execution unit 230, a communication application execution unit 240, a display unit 250, an audio output unit 260, and a wireless communication unit 270.

The navigation application execution unit 230 executes a navigation application having a navigation function for a user in a vehicle Vh. The communication application execution unit 240 executes a communication application having a transmission function and a reception function of a message. The display unit 250 is a display device such as a liquid crystal display device. When receiving a message of the communication application, the audio output unit 260 outputs the received message by an audio. The wireless communication unit 270 performs wireless communication through the network NW. These function units 230 to 270 may be realized by a processor of the terminal device 200 executing programs, or may be realized by hardware such as an LSI, an ASIC, or an FPGA.

4-2. Sequence of Processing

Figure 13:
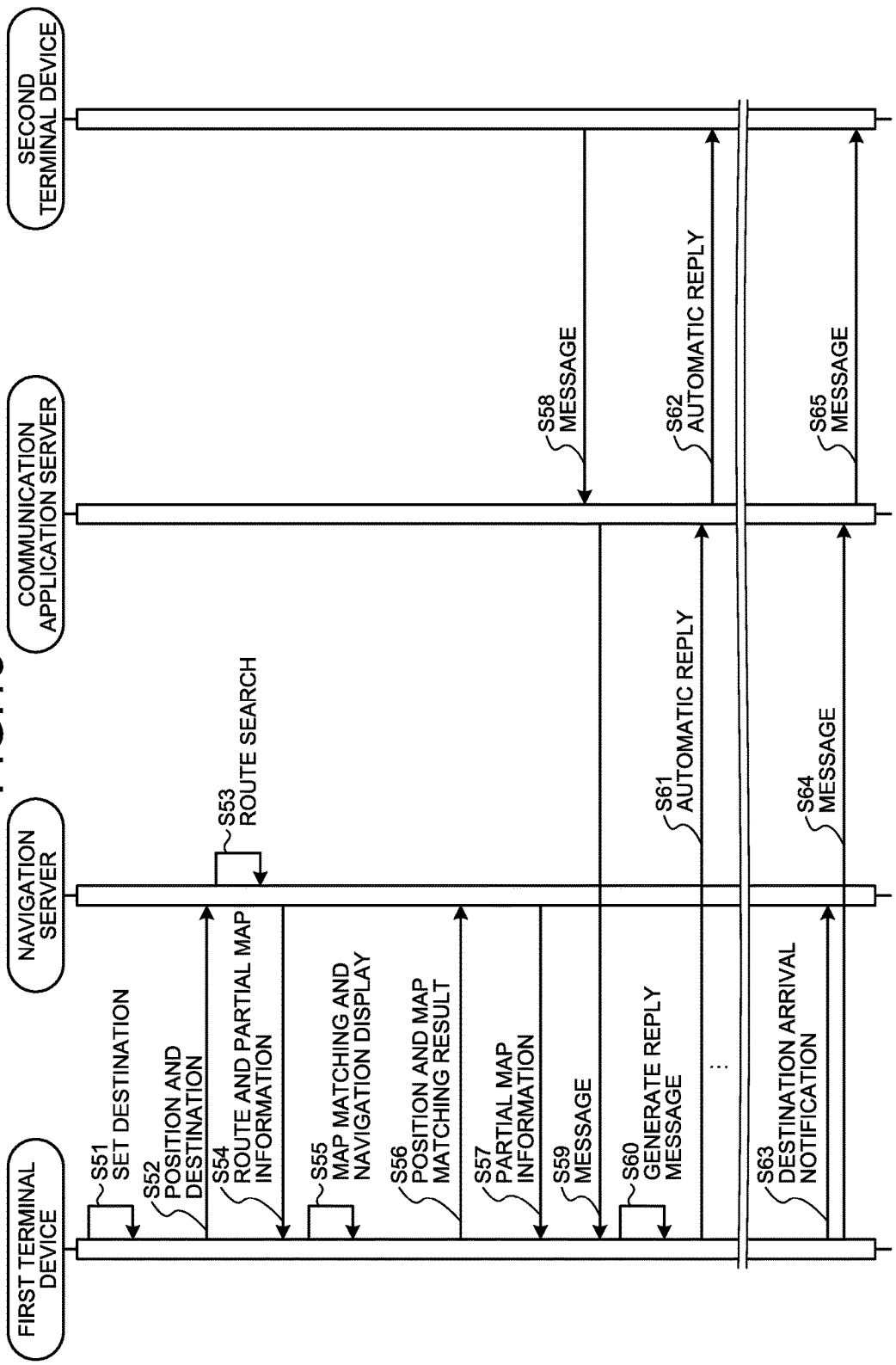
FIG. 13 is a sequence diagram illustrating a flow of processing executed in a system according to the fourth embodiment.

FIG. 13 is a sequence diagram illustrating a flow of processing executed in a system according to the fourth embodiment. In FIG. 13, for convenience, the terminal device 200 is described as "first terminal device", and the terminal device 500 is described as "second terminal device".

First, the navigation application is started in the terminal device 200, and the terminal device 200 receives setting of a destination by the user (S51). The terminal device 200 transmits a position of the terminal device 200 (hereinafter, "a position of the own device") identified by a position measuring device and the destination to a navigation server 100 (S52). The navigation server 100 performs route search, using the position, the destination, and map information 120 (S53). The navigation server 100 transmits the route as a search result, and partial map information of an area around the position of the terminal device 200 to the terminal device 200 (S54).

The terminal device 200 determines that driving of the vehicle Vh has been started on the basis of the position identified by the position measuring device. Note that the terminal device 200 may determine that the driving of the vehicle Vh has been started on the basis of an input from the user.

The terminal device 200 performs map matching processing for the position of the own device and a link included in the partial map information, generates a navigation screen on the basis of a result (hereinafter, "map matching result") of the map matching processing and the partial map information, and displays the navigation screen together with audio information (S55).

The terminal device 200 transmits the position of the own device and the map matching result to the navigation server 100 on a periodic basis (S56). As described above, the navigation server 100 and the insurance company server 300 may be integrated to function as a "navigation/insurance company server", and in this case, the navigation/insurance company server stores the map matching result received from the terminal device 200 to a storage unit. The navigation server 100 transmits the partial map information corresponding to the position to the terminal device 200 (S57).

Meanwhile, the terminal device 500 transmits the message addressed to the communication application of the terminal device 200 to the communication application server 400 (S58). The communication application server 400 transmits the message received from the terminal device 500 to the terminal device 200 (S59).

When the message to the communication application is received while the vehicle Vh is being driven, the audio output unit 260 outputs the received message by an audio. Accordingly, a driver of the vehicle Vh can get to know the content of the received message even during driving of the vehicle Vh.

In a case where a fellow passenger exists in a passenger seat of the vehicle Vh, the audio output unit 260 may not output the received message by an audio. Accordingly, the content of the message can be prevented from becoming known by the fellow passenger, and privacy of the driver can be protected. Whether the fellow passenger exists may be detected using a camera built in the terminal device 200, or may be detected using a sensor provided at the seat. Further, existence of the fellow passenger may be discriminated by inputting whether the fellow passenger exists to the communication application in advance.

When the vehicle Vh is being driven, the terminal device 200 generates a reply message to the message received from the communication application server 400 (S60), and automatically replies to the communication application server 400 with the generated message (S61). After that, the communication application server 400 transmits the message received from the terminal device 200 to the terminal device 500 (S62).

Figure 14:
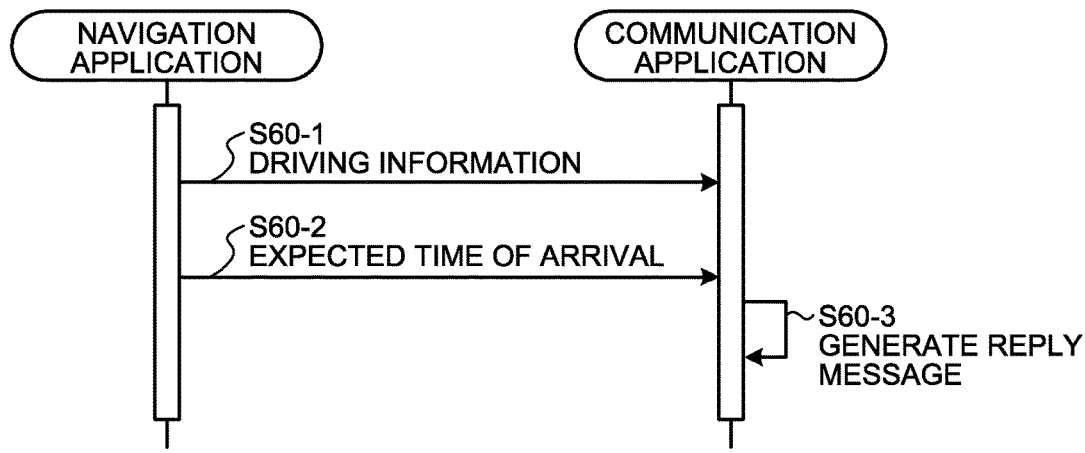
FIG. 14 is a diagram specifically illustrating reply message generation processing of S60 in the fourth embodiment.

FIG. 14 is a diagram specifically illustrating reply message generation processing of S60 in the fourth embodiment. For example, the navigation application execution unit 230 outputs driving information indicating whether the vehicle Vh is being driven from the navigation application to the communication application (S60-1). Next, the navigation application execution unit 230 outputs information indicating an expected time of arrival that is a time when the vehicle Vh arrives at the destination from the navigation application to the communication application (S60-2). In a case where the driving information input from the navigation application indicates that the vehicle Vh is being driven, the communication application execution unit 240 generates the reply message to the message received from the communication application server 400, using the information indicating the expected time of arrival input from the navigation application (S60-3).

Figure 15:
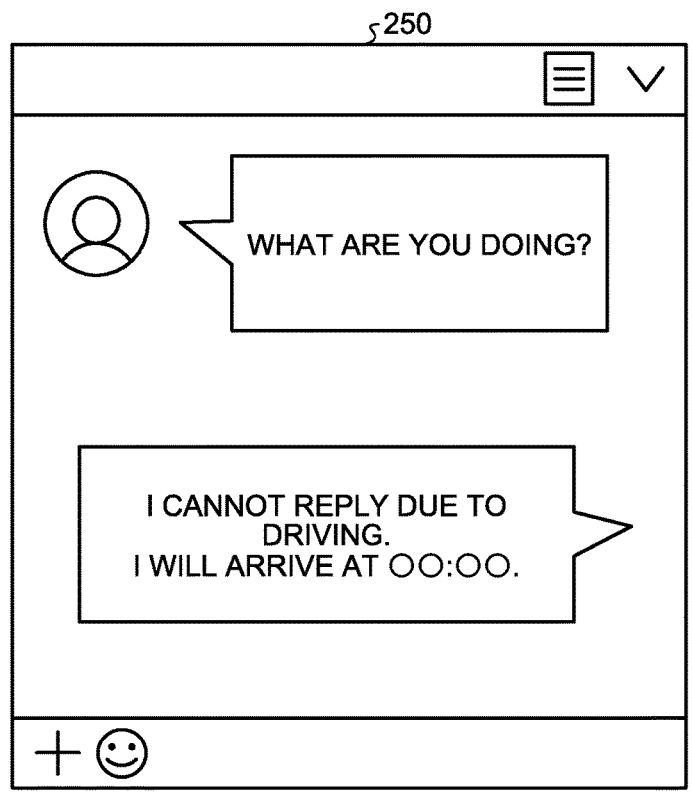
FIG. 15 is a diagram illustrating an example of a display screen of a communication application according to the fourth embodiment.

FIG. 15 is a diagram illustrating an example of a display screen of the communication application according to the fourth embodiment. As illustrated in FIG. 15, a reply message "I cannot reply due to driving, I will arrive at oo:oo." is displayed on the display unit 250 of the terminal device 200. This reply message is also displayed on a display unit of the terminal device 500. By including the expected time of arrival to the reply message, the user of the terminal device 500 who has received the reply message can expect the time to have a reply from the user of the terminal device 200 to some extent.

As described above, the communication application execution unit 240 transmits, from the communication application, the expected time of arrival of when the vehicle Vh arrives at the destination, as a reply to the message received from the terminal device 200. Note that the communication application execution unit 240 may transmit, from the communication application, a time required for the vehicle Vh to arrive at the destination, as the reply to the message received from the terminal device 200.

Further, the reply message is not limited to the example illustrated in FIG. 15. Further, the communication application execution unit 240 may change the content of an automatic reply message according to a transmission source of the received message. Accordingly, convenience of the communication application for the user can be improved.

In this way, the processing of S55 to S62 is repeatedly executed. The terminal device 200 determines whether the vehicle Vh has arrived at the destination on the basis of the position identified by the position measuring device. When the terminal device 200 determines that the vehicle Vh has arrived at the destination, the terminal device 200 transmits a destination arrival notification to the navigation server 100 (S63). Note that the terminal device 200 may determine that the vehicle Vh has arrived at the destination on the basis of an input from the user.

When the vehicle Vh has arrived at the destination, the user inputs a message, using the communication application. The terminal device 200 transmits the input message to the communication application server 400 (S64). The communication application server 400 transmits the message received from the terminal device 200 to the terminal device 500 (S65). In this way, the terminal device 200 can reply to the message received in S59.

Note that the communication application execution unit 240 may notify that the expected time of arrival or the time required has varied to the terminal device 500 through the communication application server 400, in a case where the expected time of arrival or the time required has varied by a predetermined time or more. Accordingly, the user of the terminal device 500 can more accurately expect the time of a reply from the user of the terminal device 200.

Further, the communication application execution unit 240 does not automatically reply to the message received from the terminal device 200 because safety is not impaired even if the user operates the communication application in a case where the vehicle Vh is automatically driven. Accordingly, convenience of the communication application for the user can be improved. The automatic driving refers to performing control such as acceleration, deceleration, turn, and the like by control of an in-vehicle computer.

4-3. Processing in Terminal

Figure 16:
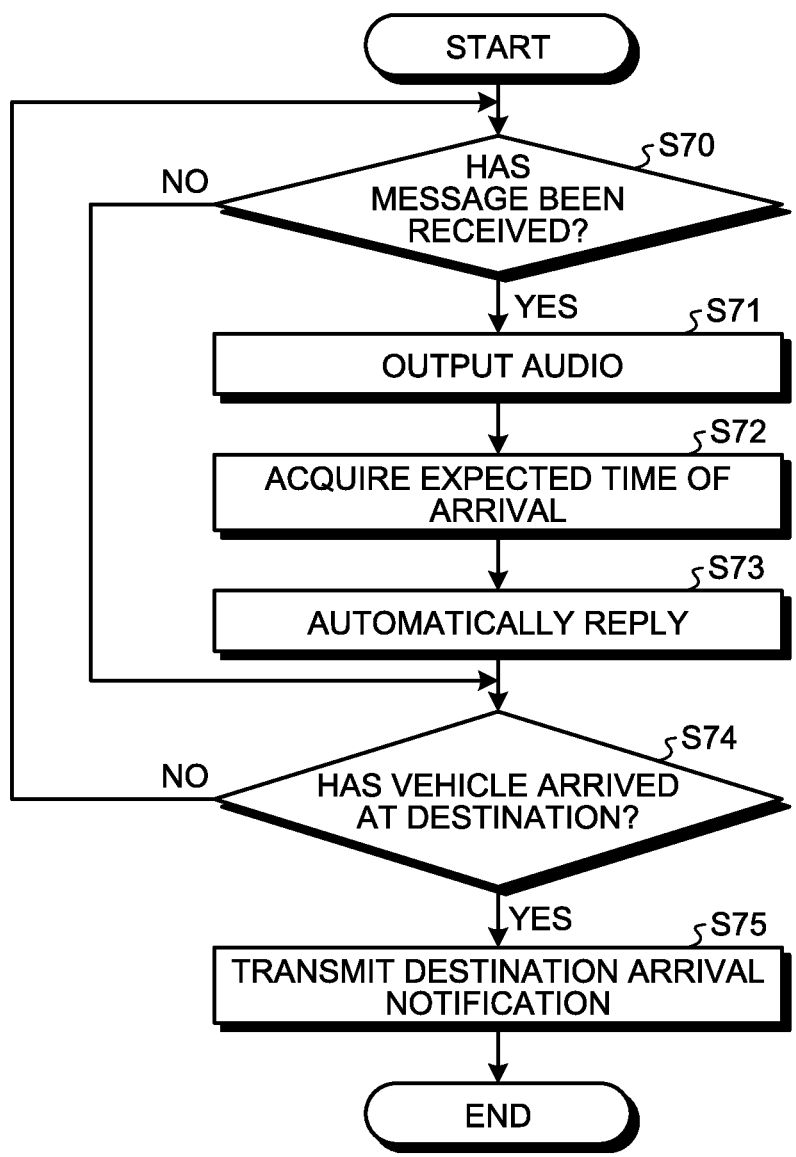
FIG. 16 is a flowchart illustrating an example of a flow of processing executed by the terminal device in the fourth embodiment.

FIG. 16 is a flowchart illustrating an example of a flow of processing executed by the terminal device 200 in the fourth embodiment. When the terminal device 200 determines that driving of the vehicle Vh has been started, the terminal device 200 executes processing of the flowchart illustrated in FIG. 16.

First, the communication application execution unit 240 of the terminal device 200 judges whether receiving a message (S70). When the communication application execution unit 240 judges that the communication application execution unit 240 has not received the message, the communication application execution unit 240 proceeds to the processing of S74 described below. Meanwhile, when the communication application execution unit 240 judges that the communication application execution unit 240 has received the message, the audio output unit 260 outputs the received message by an audio (S71).

Next, the communication application execution unit 240 acquires the expected time of arrival of when the vehicle Vh arrives at the destination, from the navigation application executed by the navigation application execution unit 230 (S72). The communication application execution unit 240 generates a reply message, using the acquired expected time of arrival. After that, the communication application execution unit 240 automatically replies to the communication application server 400 with the generated message (S73).

Next, the navigation application execution unit 230 judges whether the vehicle Vh has arrived at the destination (S74). When the navigation application execution unit 230 judges that the vehicle Vh has not arrived at the destination, the navigation application execution unit 230 returns to the processing of S70 described above. Meanwhile, when the navigation application execution unit 230 judges that the vehicle Vh has arrived at the destination, the navigation application execution unit 230 transmits the destination arrival notification to the navigation server 100 (S75), and terminates the processing by the present flowchart.

The communication application execution unit 240 may set ON/OFF of the automatic reply function illustrated in FIG. 16 on the basis of an input from the user. In this case, the set information acquisition unit 340 of the insurance company server 300 acquires the set information indicating whether the automatic reply function is set to the communication application from the terminal device 200. Further, the insurance condition determination unit 310 may determine insurance conditions for vehicle Vh or the user on the basis of the set information acquired by the set information acquisition unit 340. To be specific, the insurance condition determination unit 310 charges a lower insurance fee in a case where the automatic reply function is set to the communication application. Accordingly, the user can be prompted to set the automatic reply function, and impairment of safety due to the user operating the application during driving of the vehicle Vh can be avoided.

4-4. Effect

As described above, the terminal device of the fourth embodiment includes the navigation application execution unit 230 that executes the navigation application having the navigation function for the user in the vehicle Vh, and the communication application execution unit 240 that executes the communication application having the transmission function and the reception function of a message. When the communication application execution unit 240 receives the message to the communication application while the vehicle Vh is being driven, the communication application execution unit 240 automatically replies to the received message in cooperation with the navigation application. Accordingly, the impairment of safety due to the user operating the application during driving of the vehicle Vh can be avoided.

5. Fifth Embodiment

In the fourth embodiment, the communication application execution unit 240 has acquired the driving information indicating whether the vehicle Vh is being driven and the expected time of arrival of when the vehicle Vh arrives at the destination directly from the navigation application. In contrast, a communication application execution unit 240 of a fifth embodiment acquires, in order to improve security aspects, driving information and an expected time of arrival from a navigation application execution unit 230 through a navigation server 100. Other points are similar to those in the fourth embodiment. Hereinafter, different points between the fifth embodiment and the fourth embodiment will be described.

Figure 17:
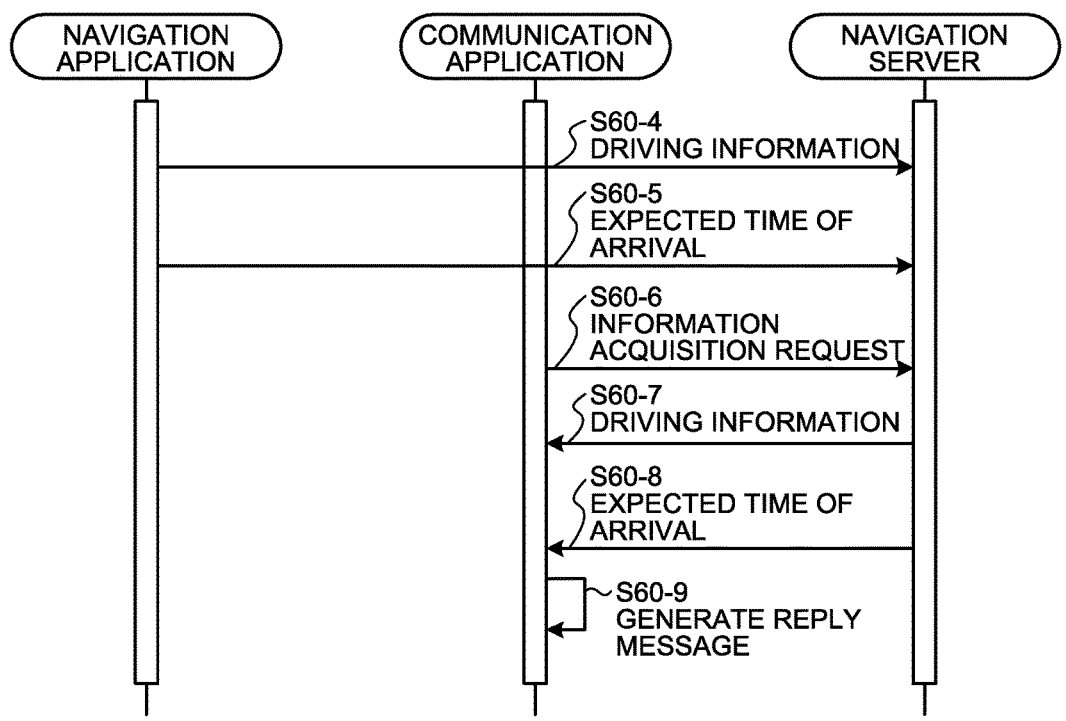
FIG. 17 is a diagram specifically illustrating reply message generation processing of S60 in a fifth embodiment.

FIG. 17 is a diagram specifically illustrating reply message generation processing of S60 in the fifth embodiment. For example, the navigation application execution unit 230 transmits driving information to the navigation server 100 (S60-4). Next, the navigation application execution unit 230 transmits the information indicating the expected time of arrival to the navigation server 100 (S60-5). The communication application execution unit 240 transmits, to the navigation server 100, an information acquisition request for acquiring the driving information and the information indicating the expected time of arrival when receiving a message from a communication application server 400 (S60-6).

The navigation server 100 transmits the driving information and the information indicating the expected time of arrival to the communication application execution unit 240 (S60-7 and S60-8) when receiving the information acquisition request transmitted from the communication application execution unit 240. In a case where the driving information received from the navigation server 100 indicates that the vehicle Vh is being driven, the communication application execution unit 240 generates the reply message to the message received from the communication application server 400, using the information indicating the expected time of arrival received from the navigation server 100 (S60-9). After that, the communication application execution unit 240 automatically replies to the communication application server 400 with the generated message (S61 of FIG. 13).

Accordingly, the communication application of the fifth embodiment acquires the information through the navigation server 100, instead of directly acquiring the information from the navigation application, thereby to improve the security aspects.

6. Sixth Embodiment

A communication application execution unit 240 of a sixth embodiment acquires, in order to improve security aspects, driving information and an expected time of arrival from a navigation application execution unit 230 through a communication application server 400. Other points are similar to those in the fourth embodiment. Hereinafter, different points between the sixth embodiment and the fourth embodiment will be described.

Figure 18:
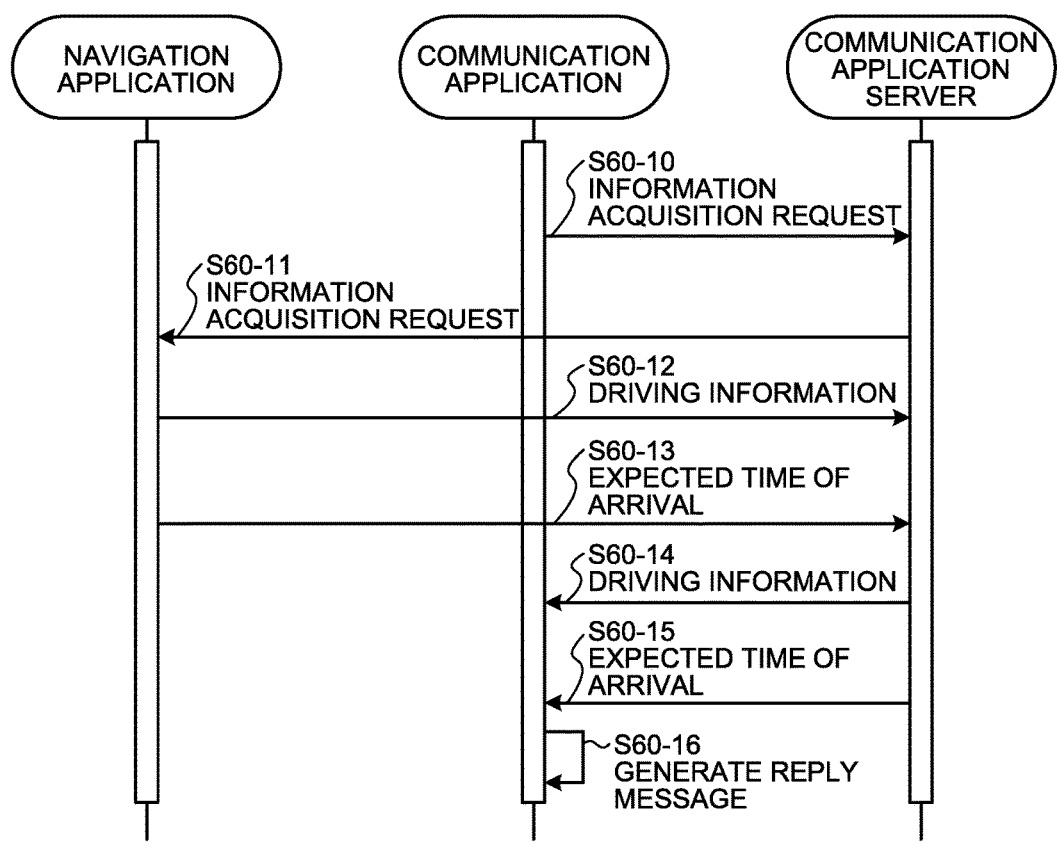
FIG. 18 is a diagram specifically illustrating reply message generation processing of S60 in a sixth embodiment.

FIG. 18 is a diagram specifically illustrating reply message generation processing of S60 in the sixth embodiment. For example, the communication application execution unit 240 transmits an information acquisition request for acquiring the driving information and information indicating the expected time of arrival to the communication application server 400 when receiving a message from the communication application server 400 (S60-10). The communication application server 400 transmits the information acquisition request received from the communication application execution unit 240 to the navigation application execution unit 230 (S60-11).

The navigation application execution unit 230 transmits the driving information to the communication application server 400 (S60-12) when receiving the information acquisition request from the communication application server 400. Next, the navigation application execution unit 230 transmits the information indicating the expected time of arrival to the communication application server 400 (S60-13). After that, the communication application server 400 transmits the driving information and the information indicating the expected time of arrival to the communication application execution unit 240 (S60-14 and S60-15).

In a case where the driving information received from the communication application server 400 indicates that the vehicle Vh is being driven, the communication application execution unit 240 generates a reply message to the message received from the communication application server 400, using the information indicating the expected time of arrival received from the communication application server 400 (S60-16). After that, the communication application execution unit 240 automatically replies to the communication application server 400 with the generated message (S61 of FIG. 13).

Accordingly, the communication application of the sixth embodiment acquires the information through the communication application server 400, instead of directly acquiring the information from the navigation application, thereby to improve the security aspects.

7. Seventh Embodiment

A communication application execution unit 240 of a seventh embodiment acquires, in order to improve security aspects, driving information and an expected time of arrival from a navigation application execution unit 230 through a navigation server 100 and a communication application server 400. Other points are similar to those in the fourth embodiment. Hereinafter, different points between the seventh embodiment and the fourth embodiment will be described.

FIG. 19 is a diagram specifically illustrating reply message generation processing of S60 in the seventh embodiment. For example, the navigation application execution unit 230 transmits the driving information to the navigation server 100 (S60-17). Next, the navigation application execution unit 230 transmits the information indicating the expected time of arrival to the navigation server 100 (S60-18). The communication application execution unit 240 transmits the information acquisition request for acquiring the driving information and the information indicating the expected time of arrival to the communication application server 400 (S60-19) when receiving the message from the communication application server 400. The communication application server 400 transmits the information acquisition request received from the communication application execution unit 240 to the navigation server 100 (S60-20).

The navigation server 100 transmits the driving information to the communication application server 400 (S60-21) when receiving the information acquisition request from the communication application server 400. Next, the navigation server 100 transmits the information indicating the expected time of arrival to the communication application server 400 (S60-22). After that, the communication application server 400 transmits the driving information and the information indicating the expected time of arrival to the communication application execution unit 240 (S60-23 and S60-24).

The communication application execution unit 240 generates the reply message to the message received from the communication application server 400, using the information indicating the expected time of arrival received from the communication application server 400, in a case where the driving information received from the communication application server 400 indicates that the vehicle Vh is being driven (S60-25). After that, the communication application execution unit 240 automatically replies to the communication application server 400 with the generated message (S61 of FIG. 13).

Accordingly, the communication application of the seventh embodiment acquires the information through the navigation server 100 and the communication application server 400, instead of directly acquiring the information from the navigation application, thereby to improve the security aspects.

The above-described plurality of embodiments is not limited to the embodiments, and can be implemented in combination with a plurality of embodiments. Further, appropriate modifications such as replacement, omission, and addition of the configuration elements can be appropriately made without departing from the gist of the present embodiment.

8. Hardware Configuration

FIG. 20 is a diagram illustrating an example of hardware configurations of the navigation server 100, the terminal device 200, the insurance company server 300, the communication application server 400, and the terminal device 500. FIG. 20 illustrates an example in which the terminal device 200 and the terminal device 500 are mobile phones such as smart phones. The terminal device 200 and the terminal device 500 have a configuration in which a CPU 601, a RAM 602, a ROM 603, a secondary storage device 604 such as a flash memory, a touch panel 605, and a wireless communication module 606 are connected to one another by an internal bus or a special communication line, for example. The navigation application is downloaded through the network NW, and is stored in the secondary storage device 604.

The servers 100, 300, and 400 have a configuration in which a network interface card (NIC) 701, a CPU 702, a RAM 703, a ROM 704, a secondary storage device 705 such as a flash memory or an HDD, and a drive device 706 are connected with one another by an internal bus or a special communication line, for example. A portable storage medium such as an optical disk is mounted to the drive device 706. Programs stored in the secondary storage device 705 or in the portable storage medium mounted to the drive device 706 are expanded to the RAM 703 by a DMA controller (not illustrated) or the like, and are executed by the CPU 702, so that the function units of the servers are realized.

According to one aspect of the present invention, safety can be improved by eliminating necessity to operate an application during driving of a vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device comprising:
a processor programmed to:
   execute a first application having a navigation function for a user in a vehicle;
   execute a second application having a transmission function and a reception function of a message;
   automatically reply to the message in cooperation with a first information processing device that controls operation of the first application, when the message is received by the second application while the vehicle is being driven;
   determine whether a passenger, which is different than the user, is present in the vehicle;
   upon the message being received by the second application while the vehicle is being driven and determining that the passenger is not present, output the message to the user of the terminal device in the vehicle via audio; and
   upon the message being received by the second application while the vehicle is being driven and determining that the passenger is present, visually output the message to the user of the terminal device in the vehicle.

2. The terminal device according to claim 1, wherein the processor is programmed to:
   in response to receiving the message, acquire driving information indicating whether the vehicle is being driven, from the first information processing device that controls operation of the first application and a second information processing device that controls operation of the second application; and
   automatically reply to the message in response to the acquired driving information indicating that the vehicle is being driven.

3. The terminal device according to claim 1, wherein the processor is programmed to:
   acquire driving information indicating whether the vehicle is being driven, from the first information processing device, when the message is received; and
   automatically reply to the message, in response to the acquired driving information indicating that the vehicle is being driven.

4. The terminal device according to claim 1, wherein the processor is programmed to:
   acquire driving information indicating whether the vehicle is being driven, from a second information processing device that controls operation of the second application, when the message is received; and
   automatically reply to the message, in response to the acquired driving information indicating that the vehicle is being driven.

5. The terminal device according to claim 1, wherein the processor is programmed to:
   acquire driving information indicating whether the vehicle is being driven, in response to the message being received; and
   automatically reply to the message from the second application, in response to the acquired driving information indicating that the vehicle is being driven.

6. The terminal device according to claim 1, wherein the processor is programmed to reply with an expected time of arrival of when the vehicle arrives at a destination, or a time required for the vehicle to arrive at the destination, from the second application, as a reply to the message.

7. The terminal device according to claim 6, wherein the processor is programmed to, when the expected time of arrival or the time required has varied by a predetermined time or more, transmit a second reply to the message notifying that the expected time of arrival or the time required has varied to a transmission source of the message.

8. The terminal device according to claim 1, wherein the processor is programmed to not output the received message by audio, when the passenger is present in a passenger seat of the vehicle.

9. The terminal device according to claim 1, wherein the processor is programmed to change content of the automatic reply message according to a transmission source of the received message.

10. A terminal device comprising:
a processor programmed to:
   execute a first application having a navigation function for a user in a vehicle;
   execute a second application having a transmission function and a reception function of a message;
   automatically reply to the message in cooperation with a first information processing device that controls operation of the first application, when the message is received by the second application while the vehicle is being driven, and not automatically reply to the message, when the vehicle is being driven by automatic driving.

11. A non-transitory computer-readable storage medium having stored therein a program for causing a computer to:
   execute a first application having a navigation function for a user in a vehicle;
   execute a second application having a transmission function and a reception function of a message;
   when the message is received by the second application while the vehicle is being driven, automatically reply to the message in cooperation with the first application;
   determine whether a passenger, which is different than the user, is present in the vehicle;

upon the message being received by the second application while the vehicle is being driven and determining that the passenger is not present, output the message to the user of the terminal device in the vehicle via audio; and upon the message being received by the second application while the vehicle is being driven and determining that the passenger is present, visually output the message to the user of the terminal device in the vehicle.

12. An insurance condition determination device comprising:
a processor programmed to:
acquire set information, when receiving, from a terminal device that executes a first application having a navigation function for a user in a vehicle and a second application having a transmission function and a reception function of a message, the message by the second application being received while the vehicle is being driven, the set information indicating whether an automatic reply function to automatically reply to the message in cooperation with the first application is set, and indicating whether the terminal device outputs the message to the user of the terminal device in the vehicle upon the message being received by the second application while the vehicle is being driven, the message being output via audio upon determining that a passenger is not present and the message being visually output upon determining that the passenger is present; and
determine an insurance condition for the vehicle or the user based on the acquired set information.

13. A terminal device comprising:
a processor programmed to:
execute a first application having a navigation function for a user in a vehicle;
execute a second application having a transmission function and a reception function of a message;
determine whether a passenger, which is different than the user, is present in the vehicle;
automatically reply to the message in cooperation with a first information processing device that controls operation of the first application, when the message is received by the second application while the vehicle is being driven, the automatic reply including an estimated time of arrival of the vehicle;
subsequent to sending the automatic reply, generate and transmit a second automatic reply including an updated estimated time of arrival when the estimated time of arrival changes by a predetermined amount of time;
upon the message being received by the second application while the vehicle is being driven and determining that the passenger is not present, output the message to the user of the terminal device in the vehicle via audio; and
upon the message being received by the second application while the vehicle is being driven and determining that the passenger is present, visually output the message to the user of the terminal device in the vehicle.

* * * * *